United States Patent
Chilana et al.

(10) Patent No.: US 9,811,583 B2
(45) Date of Patent: Nov. 7, 2017

(54) SYSTEMS AND METHODS FOR SELECTION-BASED CONTEXTUAL HELP RETRIEVAL

(75) Inventors: Parmit K. Chilana, Waterloo (CA); Andrew J. Ko, Seattle, WA (US); Jacob O. Wobbrock, Seattle, WA (US)

(73) Assignee: University of Washington Through Its Center for Commercialization, Seattle, WA (US)

( * ) Notice: Subject to any disclaimer, the term of this patent is extended or adjusted under 35 U.S.C. 154(b) by 162 days.

(21) Appl. No.: 14/126,967

(22) PCT Filed: Jun. 18, 2012

(86) PCT No.: PCT/US2012/042979
§ 371 (c)(1),
(2), (4) Date: Feb. 12, 2014

(87) PCT Pub. No.: WO2012/174547
PCT Pub. Date: Dec. 20, 2012

(65) Prior Publication Data
US 2014/0149432 A1 May 29, 2014

Related U.S. Application Data

(60) Provisional application No. 61/498,326, filed on Jun. 17, 2011, provisional application No. 61/540,403, filed on Sep. 28, 2011.

(51) Int. Cl.
*G06F 17/30* (2006.01)
*G06F 9/44* (2006.01)

(52) U.S. Cl.
CPC ...... *G06F 17/30648* (2013.01); *G06F 9/4446* (2013.01); *G06F 17/30528* (2013.01)

(58) Field of Classification Search
CPC .................................................. G06F 17/30648
(Continued)

(56) References Cited

U.S. PATENT DOCUMENTS

| 5,122,972 A | 6/1992 | Richards et al. |
| 5,546,521 A | 8/1996 | Martinez |

(Continued)

FOREIGN PATENT DOCUMENTS

| EP | 2721529 | 4/2014 |
| WO | 2012/174547 | 12/2012 |

OTHER PUBLICATIONS

Ackerman, M.S. and Malone, T.W. Answer Garden: a tool for growing organizational memory. Proceedings of the ACM SIGOIS and IEEE CS TC-OA (1990), 31-39.

(Continued)

*Primary Examiner* — Syling Yen
(74) *Attorney, Agent, or Firm* — McDonnell Boehnen Hulbert & Berghoff LLP

(57) ABSTRACT

Described herein are systems and methods for selection-based contextual help retrieval. One example method involves (a) receiving first-query data including contextual data, the contextual data indicating a user-interface element type, a user-interface element location, and user-interface element text; (b) determining at least one first-query response based on at least the contextual data; and (c) causing an indication of the determined at least one first-query response to be provided via an output device.

26 Claims, 18 Drawing Sheets

(58) Field of Classification Search
USPC ............... 707/706, 722, 736, 741, 748, 749, 707/999.001–2; 715/705, 762
See application file for complete search history.

(56) References Cited

U.S. PATENT DOCUMENTS

| | | | |
|---|---|---|---|
| 6,134,019 A * | 10/2000 | Wantuck et al. | 358/1.15 |
| 6,151,059 A | 11/2000 | Schein et al. | |
| 6,202,058 B1 * | 3/2001 | Rose | G06F 17/30699 706/45 |
| 6,340,977 B1 | 1/2002 | Lui et al. | |
| 6,349,977 B1 | 2/2002 | Ketcham et al. | |
| 6,959,294 B2 | 10/2005 | Sullivan et al. | |
| 7,519,562 B1 * | 4/2009 | Vander Mey et al. | 705/500 |
| 7,543,232 B2 | 6/2009 | Easton et al. | |
| 7,849,405 B1 | 12/2010 | Coletta et al. | |
| 7,861,178 B2 | 12/2010 | Liu et al. | |
| 8,903,751 B1 * | 12/2014 | Yarbrough et al. | 706/20 |
| 2002/0023144 A1 * | 2/2002 | Linyard et al. | 709/218 |
| 2002/0165905 A1 * | 11/2002 | Wilson | 709/203 |
| 2004/0034831 A1 * | 2/2004 | Grober | G06F 17/2247 715/234 |
| 2005/0028156 A1 | 2/2005 | Hammond et al. | |
| 2007/0050719 A1 * | 3/2007 | Lui et al. | 715/762 |
| 2007/0122788 A1 * | 5/2007 | Stevens, Jr. | 434/323 |
| 2008/0109722 A1 | 5/2008 | Gengler et al. | |
| 2008/0126932 A1 | 5/2008 | Elad et al. | |
| 2008/0301558 A1 | 12/2008 | Najafi et al. | |
| 2009/0271283 A1 * | 10/2009 | Fosnacht | G06Q 20/123 705/26.1 |
| 2010/0050079 A1 | 2/2010 | Thompson | |
| 2011/0016392 A1 * | 1/2011 | Humeniuk | 715/705 |

OTHER PUBLICATIONS

Adar, E., Teevan, J., Dumais, S.T., and Elsas, J.L. The Web changes everything: Understanding the dynamics of Web content. Proc WSDM, ACM (2009), 282-291.
Belkin, N.J. Helping people find what they don't know. Commun. ACM 43, 8 (2000), 58-61.
Bolin, M., Webber, M., Rha, P., Wilson, T., and Miller, R.C. Automation and customization of rendered web pages. Proc UIST, ACM (2005), 163-172.
Brandt, J., Dontcheva, M., Weskamp, M., and Klemmer, S.R. Example-centric programming: integrating web search into the development environment. Proc CHI (2010), 513-522.
Chilana, P.K., Grossman, T., Fitzmaurice, G. Modern Software Support Processes and the Usage of Multimedia Formats. Proc CHI (2011), to appear.
Delisle, S. and Moulin, B. User interfaces and help systems: from helplessness to intelligent assistance. Artificial Intelligence Review 18, 2 (2002), 117-157.
Downs, J.S., Holbrook, M.B., Sheng, S., and Cranor, L.F. Are your participants gaming the system?: screening mechanical turk workers. Proc CHI ACM (2010), 2399-2402.
Farkas, D.K. The role of balloon help. ACM SIGDOC Journal of Computer Documentation 17, 2 (1993), 3-19.
Finin, T.W. Providing help and advice in task oriented systems. Proc Artificial intelligence—vol. 1, Morgan Kaufmann Publishers Inc. (1983), 176-178.
Furnas, G.W., Landauer, T.K., Gomez, L.M., and Dumais, S.T. The vocabulary problem in human-system communication. Commun. ACM 30, 11 (1987), 964-971.
Grossman, T. and Fitzmaurice, G. Toolclips: An investigation of contextual video assistance for functionality understanding. Proc CHI, ACM (2010), 1515-1524.
Halsted, K.L. and Roberts, J.H. Eclipse help system: anopen source user assistance offering. Proc SIGDOC,ACM (2002), 49-59.
Harper, F.M., Raban, D., Rafaeli, S., and Konstan, J.A. Predictors of answer quality in online Q\&A sites. ProcSIGCHI ACM (2008), 865-874.

Hartmann, B., MacDougall, D., Brandt, J., and Klemmer, S.R. What would other programmers do: suggesting solutions to error messages. Proc CHI ACM (2010), 1019-1028.
Hastie, H.W., Johnston, M., and Ehlen, P. Context-Sensitive Help for Multimodal Dialogue. Proc Multimodal Interfaces—vol. 00, IEEE Computer Society (2002), 93.
Horvitz, E. Principles of mixed-initiative user interfaces. Proc CHI (1999), 159-166.
Huang, J. and Twidale, M.B. Graphstract: minimal graphical help for computers. Proc UIST ACM (2007), 203-212.
Kittur, A., Chi, H., and Suh, B. Crowdsourcing user studies with Mechanical Turk. (2008).
Ko, A.J. and Myers, B.A. Designing the whyline: a debugging interface for asking questions about program behavior. Proc CHI, ACM (2004), 151-158.
Lakhani, K.R. and Von Hippel, E. How open source software works:"free" user-to-user assistance. Research policy 32, 6 (2003), 923-943.
Leshed, G., Haber, E.M., Matthews, T., and Lau, T. CoScripter: automating & sharing how-to knowledge in the enterprise. Proc CHI (2008), 1719-1728.
Li, I., Nichols, J., Lau, T., Drews, C., and Cypher, A. Here's what I did: Sharing and reusing web activity with ActionShot. Proc CHI ACM (2010), 723-732.
Matejka, J., Li, W., Grossman, T., and Fitzmaurice, G. CommunityCommands: command recommendations for software applications. Proc UIST (2009), 193-202.
Morris, M.R., Teevan, J., and Panovich, K. What do people ask their social networks, and why?: a survey study of status message q&a behavior. Proc CHI ACM (2010), 1739-1748.
Myers, B.A., Weitzman, D.A., Ko, A.J., and Chau, D.H. Answering why and why not questions in user interfaces.Proc CHI ACM (2006), 397-406.
Palanque, P., Bastide, R., and Dourte, L. Contextual help for free with formal dialogue design. Advances in Human Factors Ergonomics 19, (1993), 615-615.
Pangoli, S. and Patern, F. Automatic generation of taskoriented help. Proc UIST, ACM (1995), 181-187.
Paolacci, G., Chandler, J., and Ipeirotis, P.G. Running experiments on amazon mechanical turk. Judgment and Decision Making 5, 5 (2010), 411-419.
Ramachandran, A. and Young, R.M. Providing intelligent help across applications in dynamic user and environment contexts. Proc IUI, ACM (2005), 269-271.
Salton, G., Wong, A., and Yang, C.S. A vector space model for automatic indexing. Commun. ACM 18, 11 (1975), 613-620.
Singh, V., Twidale, M., and Nichols, D. Users of Open Source Software—How Do They Get Help? System Sciences, 2009. HICSS '09. (2009), 1-10.
Singh, V., Twidale, M.B., and Rathi, D. Open Source Technical Support: A Look at Peer Help-Giving. HICSS' 06, IEEE Computer Society (2006), 118.3.
Snow, R., O'Connor, B., Jurafsky, D., and Ng, A.Y. Cheap and fast—but is it good?: evaluating non-expert annotations for natural language tasks. Proc Natural Language Processing, Association for Computational Linguistics (2008), 254-263.
Stevens, G. and Wiedenh\&\#246:fer, T. Chic—a pluggable solution for community help in context. Proc NORDICHI ACM (2006), 212-221.
Sukaviriya, P. and Foley, J.D. Coupling a UI framework with automatic generation of context-sensitive animated help. Proc UIST, ACM (1990), 152-166.
Twidale, M.B. Over the shoulder learning: supporting brief informal learning. (CSCW) 14, 6 (2005), 505-547.
Tynan-Wood, C. The (Better) Future of Tech Support. InfoWorld, 2010.
Virvou, M. and Kabassi, K. An intelligent learning environment for novice users of a GUI. Intelligent Tutoring Systems, Springer (2000), 484-493.
Yeh, T., Chang, T.H., and Miller, R.C. Sikuli: using GUI screenshots for search and automation. Proc UIST (2009), 183-192.
International Search Report for PCT/US2012/042979, dated Aug. 2, 2013.

(56) References Cited

OTHER PUBLICATIONS

E. Adar et al., "Zoetrope: Interacting with the Ephemeral Web", Proceedings of the 21st Annual ACM Symposium on User Interface Software and Technology (UIST '08), Oct. 19, 2008, pp. 239-248.
Amazon.com, Inc., "Amazon Mechanical Turk", Feb. 9, 2016, available online at www.mturk.com/ (retrieved Feb. 9, 2016).
P. K. Chilana et al., "LemonAid: Selection-Based Crowdsourced Contextual Help for Web Applications", Proceedings of the SIGCHI Conference on Human Factors in Computing Systems (CHI '12), May 5, 2012, pp. 1549-1558.
M. Ekstrand et al., "Searching for Software Learning Resources Using Application Context", Proceedings of the 24th Annual ACM Symposium on User Interface Software and Technology (UIST '11), Oct. 16, 2011, pp. 195-204.
Goggle Inc., Google Calendar—Help forum, Dec. 19, 2011, available online at www.google.com/support/forum/p/Calendar/ (retrieved Feb. 9, 2016).
Intuit Inc.,TurboTax Support, May 4, 2012, available online at turbotax.intuit.com/support/ (retrieved Feb. 9, 2016).
J. Matejka et al., "IP-QAT: In-Product Questions, Answers & Tips," Proceedings of the 24th Annual ACM Symposium on User Interface Software and Technology (UIST '11), Oct. 16, 2011, pp. 175-184.
T. Yeh et al., "Creating Contextual Help for GUIs Using Screenshots," Proceedings of the 24th Annual ACM Symposium on User Interface Software and Technology (UIST '11), Oct. 16, 2011, pp. 145-154.

* cited by examiner

SYSTEMS AND METHODS FOR SELECTION-BASED CONTEXTUAL HELP RETRIEVAL

RELATED APPLICATIONS

This application is a U.S. national phase of International Application No. PCT/US2012/042979 filed Jun. 18, 2012, which claims priority to U.S. Provisional Patent Application Ser. No. 61/498,326 filed Jun. 17, 2011, entitled Systems and Methods for Selection-Based, Crowdsourced, Contextual Help Retrieval in Web Applications, and to U.S. Provisional Patent Application Ser. No. 61/540,403 filed Sep. 28, 2011, entitled Systems and Methods for Selection-Based, Crowdsourced, Contextual Help Retrieval in Web Applications, which are incorporated herein in their entirety.

STATEMENT OF U.S. GOVERNMENT INTEREST

This invention was made with government support under CCF-0952733 awarded by the National Science Foundation. The government has certain rights in the invention.

COPYRIGHT NOTICE

Contained herein is material that is subject to copyright protection. The copyright owner has no objection to the reproduction of the patent disclosure by any person as it appears in the Patent and Trademark Office patent files or records, but otherwise reserves all rights to the copyright whatsoever.

BACKGROUND

Unless otherwise indicated herein, the materials described in this section are not prior art to the claims in this application and are not admitted to be prior art by inclusion in this section.

With the proliferation of computing technologies, the usability of computing systems, and the usability of computing applications utilized to interact with such computing systems, has improved greatly. Nonetheless, many users encounter difficulties when attempting to learn how to use and configure computing applications to meet their particular needs. Indeed, as computing applications, including web-based applications, become more dynamic, feature-rich, and customizable, users' needs for assistance with the use of such applications increases.

While computing-application "help features" have a long history, one of the most powerful help features to have yet emerged is "crowdsourced" help. Crowdsourced forms of help enable users to help each other answer questions in, for example, discussion forums, mailing lists, or within online social networks. It is generally recognized that crowdsourced help is powerful at generating answers to help questions. However, it is generally considered difficult to find answers to such questions. More particularly, it may be difficult for a user to locate the answer to a question that has previously been asked and answered. For example, the onus is on the user to sift through a variety of potential answer resources, evaluate and disregard a large amount of irrelevant material, and/or craft keywords for use in key word searching in an attempt to locate a sought-after answer.

An improvement is therefore desired.

SUMMARY

Described herein are systems and methods for selection-based contextual help retrieval that leverages a user's interaction with a user-interface of a computing application to enable the user to ask questions, provide solutions, and efficiently search for help within the hierarchy of the user-interface itself.

In one aspect, a first computer-implemented method is provided. The method may involve: (a) receiving first-query data including contextual data, the contextual data indicating a user-interface element type, a user-interface element location, and user-interface element text; (b) determining at least one first-query response based on at least the contextual data; and (c) causing an indication of the determined at least one first-query response to be provided via an output device.

In a further aspect, a first system is provided. The system may include: (1) a processor; (2) a physical computer readable medium; and (3) program instructions stored on the physical computer readable medium and executable by the processor to: (a) receive first-query data including contextual data, the contextual data indicating a user-interface element type, a user-interface element location, and user-interface element text; (b) determine at least one first-query response based on at least the contextual data; and (c) cause an indication of the determined at least one first-query response to be provided via an output device.

In a further aspect, a first physical computer-readable medium is provided. The physical computer-readable medium may include instructions including: (a) instructions for receiving first-query data including contextual data, the contextual data indicating a user-interface element type, a user-interface element location, and user-interface element text; (b) instructions for determining at least one first-query response based on at least the contextual data; and (c) instructions for causing an indication of the determined at least one first-query response to be provided via an output device.

In a further aspect, a second computer-implemented method is provided. The method may involve: (a) receiving help-mode data indicating a user-preference to enter a help mode corresponding to a graphical user-interface including at least one graphical-user-interface element; (b) entering the help mode corresponding to the graphical user-interface, the help mode including: (i) providing an information-overlay interface corresponding to the graphical user-interface, where the information-overlay interface includes at least one information-overlay-interface element corresponding to at least one respective graphical-user-interface element; (ii) receiving selection data indicating a selection of the at least one information-overlay-interface element; and (iii) causing a visual indication of the selection of the at least one information-overlay-interface element to be displayed on a graphical display.

In a further aspect, a second system is provided. The system may include: (1) a processor; (2) a physical computer readable medium; and (3) program instructions stored on the physical computer readable medium and executable by the processor to: (a) receive help-mode data indicating a user-preference to enter a help mode corresponding to a graphical user-interface including at least one graphical-user-interface element; (b) enter the help mode corresponding to the graphical user-interface, the help mode including: (i) providing an information-overlay interface corresponding to the graphical user-interface, where the information-overlay interface includes at least one information-overlay-interface element corresponding to at least one respective graphical-user-interface element; (ii) receiving selection data indicating a selection of the at least one information-overlay-interface element; and (iii) causing a visual indication of the selection of the at least one information-overlay-interface element to be displayed on a graphical display.

In a further aspect, a second physical computer-readable medium is provided. The physical computer-readable medium may include instructions including: (a) instructions for receiving help-mode data indicating a user-preference to enter a help mode corresponding to a graphical user-interface including at least one graphical-user-interface element; (b) instructions for entering the help mode corresponding to the graphical user-interface, the help mode including: (i) providing an information-overlay interface corresponding to the graphical user-interface, where the information-overlay interface includes at least one information-overlay-interface element corresponding to the at least one respective graphical-user-interface element; (ii) receiving selection data indicating a selection of the at least one information-overlay-interface element; and (iii) causing a visual indication of the selection of the at least one information-overlay-interface element to be displayed on a graphical display.

In a further aspect, a third method is provided. The method may involve: (a) causing a display of a content window on a graphical display, the content window including a content element and a feedback element; (b) receiving feedback data indicating (i) a selection of the feedback element and (ii) a utility of the content element; and (c) in response to receiving the feedback data, no longer causing the display of the content window on the graphical display, where the content window is displayed at least until the feedback data is received.

In a further aspect, a third system is provided. The system may include: (1) a processor; (2) a physical computer readable medium; and (3) program instructions stored on the physical computer readable medium and executable by the processor to: (a) cause a display of a content window on a graphical display, the content window including a content element and a feedback element; (b) receive feedback data indicating (i) a selection of the feedback element and (ii) a utility of the content element; and (c) in response to receiving the feedback data, no longer causing the display of the content window on the graphical display, where the content window is displayed at least until the feedback data is received.

In a further aspect, a third physical computer-readable medium is provided. The physical computer-readable medium may include instructions including: (a) instructions for causing a display of a content window on a graphical display, the content window including a content element and a feedback element; (b) instructions for receiving feedback data indicating (i) a selection of the feedback element and (ii) a utility of the content element; and (c) instructions for, in response to receiving the feedback data, no longer causing the display of the content window on the graphical display, where the content window is displayed at least until the feedback data is received.

These as well as other aspects, advantages, and alternatives, will become apparent to those of ordinary skill in the art by reading the following detailed description, with reference where appropriate to the accompanying drawings.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that aspects of the present disclosure, as generally described herein, and illustrated in the figures, can be arranged, substituted, combined, separated, and/or designed in a wide variety of different configurations, all of which are explicitly contemplated herein.

1. EXAMPLE ARCHITECTURE

Figure 1:
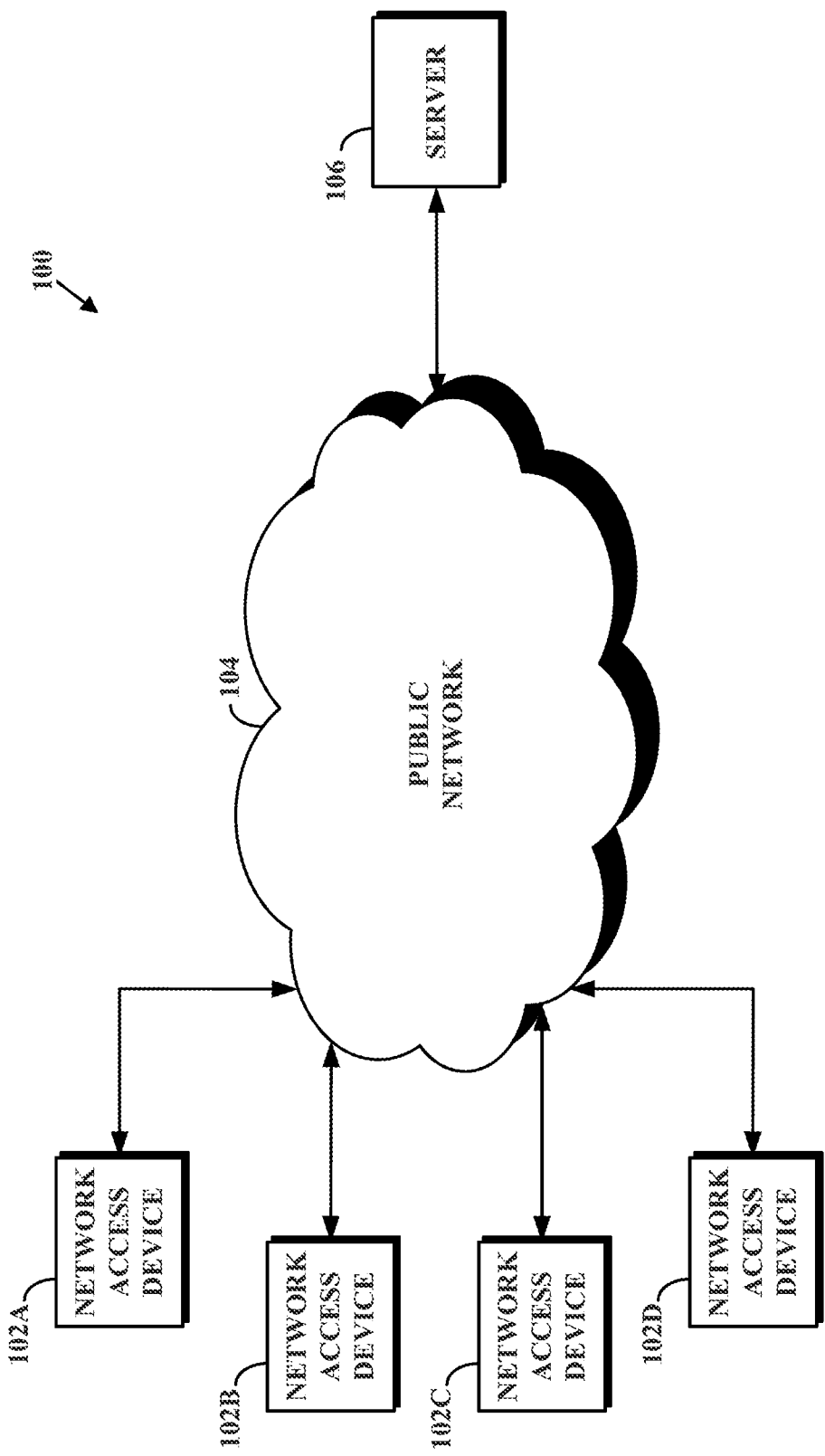
FIG. 1 shows a simplified block diagram of an example communication network in which the present methods can be implemented.

FIG. 1 shows a simplified block diagram of an example communication network in which the present method can be implemented. It should be understood that this and other arrangements described herein are set forth only as examples. Those skilled in the art will appreciate that other arrangements and elements (e.g., machines, interfaces, functions, orders, and groupings of functions, etc.) can be used instead and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. And various functions described herein may be carried out by a processor executing instructions stored in memory.

As shown in FIG. 1, example network 100 includes various network-access devices 102A-102D, public network 104 such as the Internet, and server 106. Note that additional entities not depicted in FIG. 1 could be present as well. As an example, there could be more network-access devices and more servers in communication with public network 104. Other network elements may be in communication with public network 104 as well. Also, there could be one or more devices and/or networks making up at least part of one or more of the communication links depicted in FIG. 1. As an example, there could be one or more routers, switches, or other devices or networks on the communication links between network-access devices 102A-102D, public network 104, and/or server 106.

Figure 2:
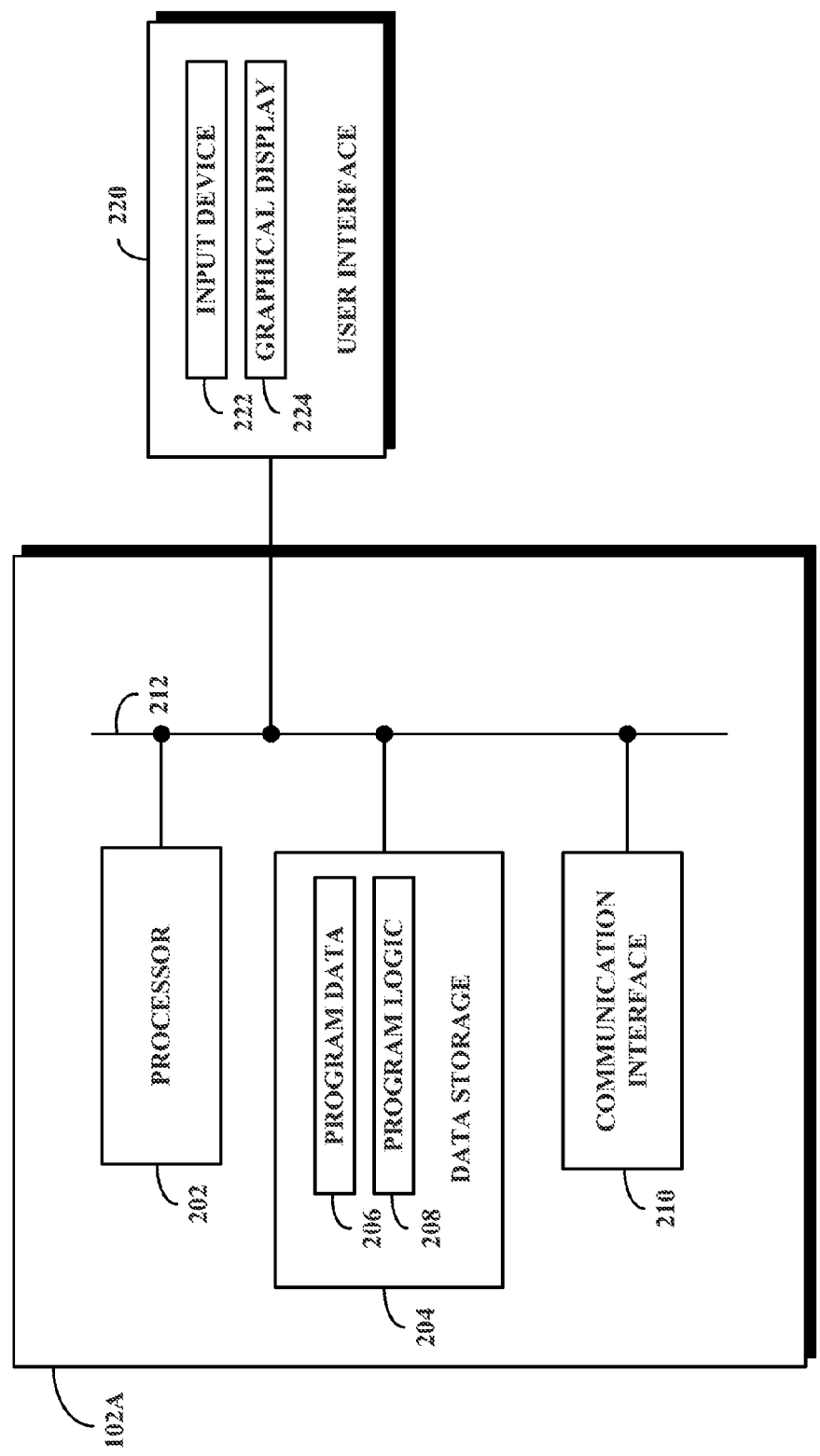
FIG. 2 shows a simplified block diagram of a network-access device arranged to implement aspects of at least one embodiment of the methods.

Each of network-access devices 102A-102D may be any network-access device arranged to carry out the network-access device functions described herein. As such each of network-access devices 102A-102D, including network-access device 102A as shown in FIG. 2A, may include processor 202, data storage 204, and communication interface 210, all linked together via system bus, network, or other connection mechanism 212.

Processor 202 may include one or more general purpose microprocessors and/or one or more dedicated signal processors and may be integrated in whole or in part with communication interface 210. Data storage 204 may include memory and/or other storage components, such as optical, magnetic, organic or other memory disc storage, which can be volatile and/or non-volatile, internal and/or external, and integrated in whole or in part with processor 202. Data storage 204 may be arranged to contain (i) program data 206 and (ii) program logic 208. Although these components are described herein as separate data storage elements, the elements could just as well be physically integrated together or distributed in various other ways. For example, program data 206 may be maintained in data storage 204 separate from program logic 208, for easy updating and reference by program logic 208.

Communication interface 210 typically functions to communicatively couple network-access device 102A to networks, such as public network 104. As such, communication interface 210 may include a wired (e.g., Ethernet) and/or wireless (e.g., Wi-Fi) packet-data interface, for communicating with other devices, entities, and/or networks. Network-access device 102A may also include multiple interfaces 210, such as one through which network-access device 102A sends communication, and one through which network-access device 102A receives communication.

Network-access device 102A may also include, or may be otherwise communicatively coupled to, user interface 220. User interface 220 may include input device 222 including, for example, buttons, a touch screen, a microphone, and/or any other elements for receiving inputs. User interface 220 may also include one or more elements for communicating outputs, for example, one or more graphical displays 224 and/or a speaker. In operation, user interface 220 may be configured to display a graphical user interface (GUI) via graphical display 224 and may also be configured to receive inputs, via input device 222, corresponding to use of such a GUI. In some embodiments, input device 222 may include a visual-capture device such as a camera. The camera may be configured and/or arranged to track eye movements.

Figure 3:
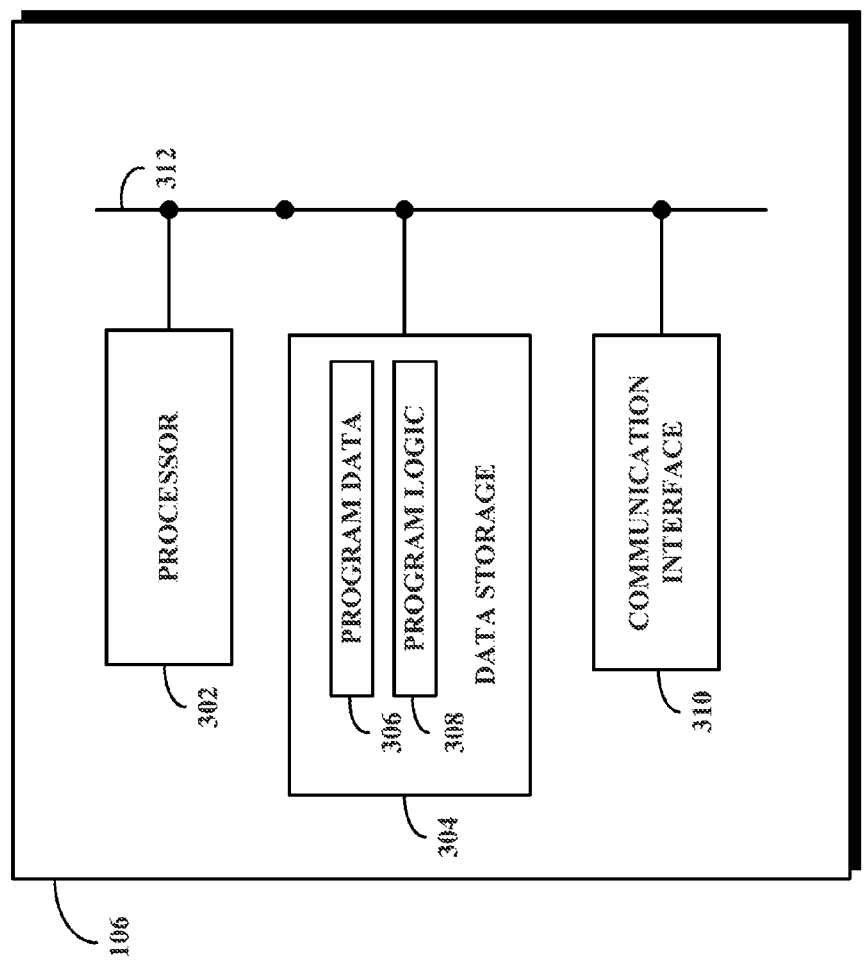
FIG. 3 shows a simplified block diagram of a server arranged to implement aspects of at least one embodiment of the methods.
Figure 5A:
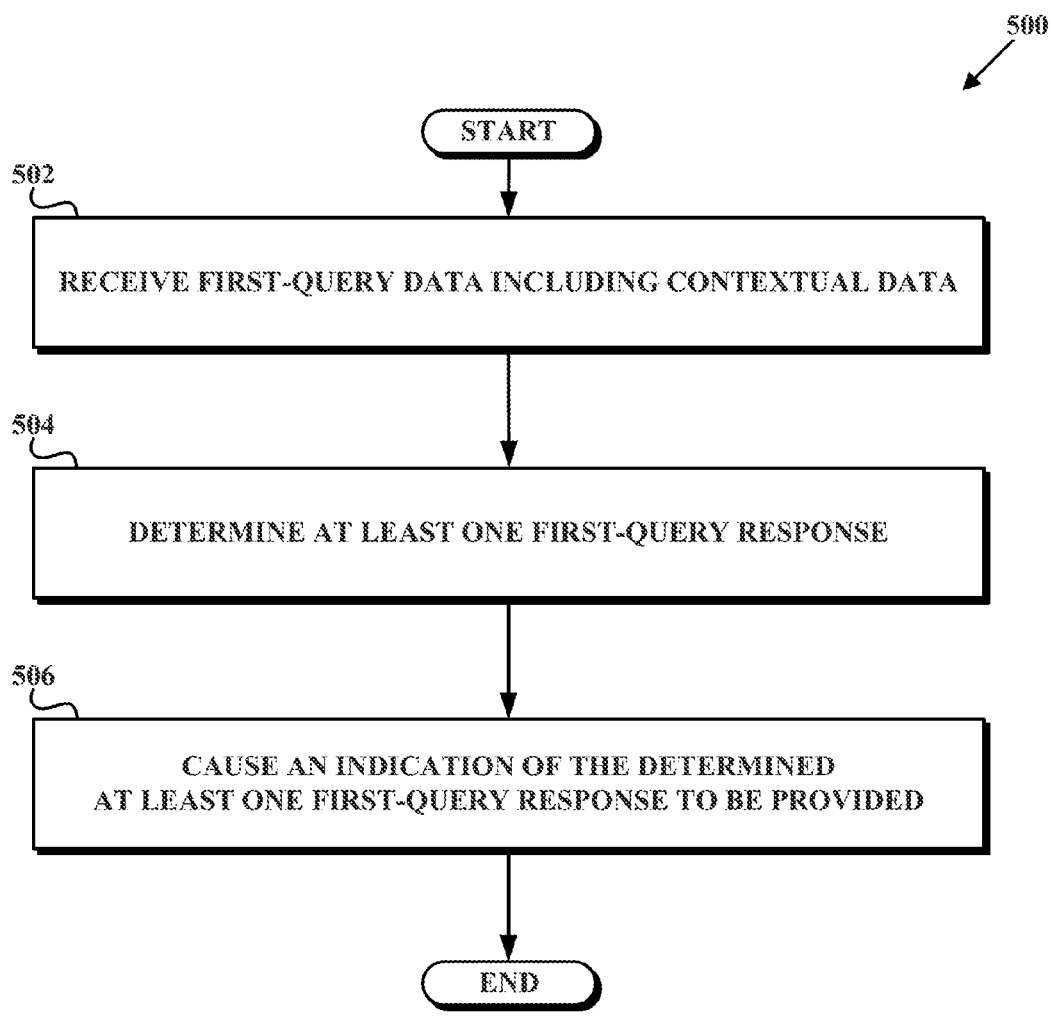
FIGS. 5A-5B are simplified flow charts depicting aspects of an example method.
Figure 5B:
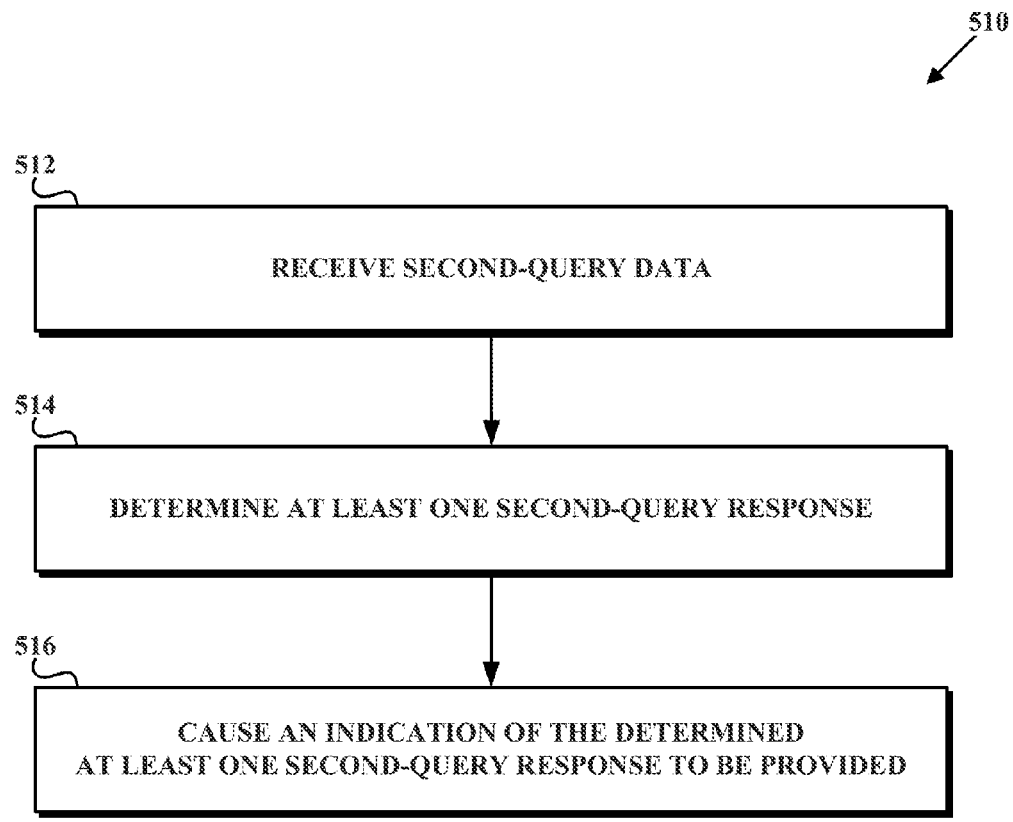
Figure 6:
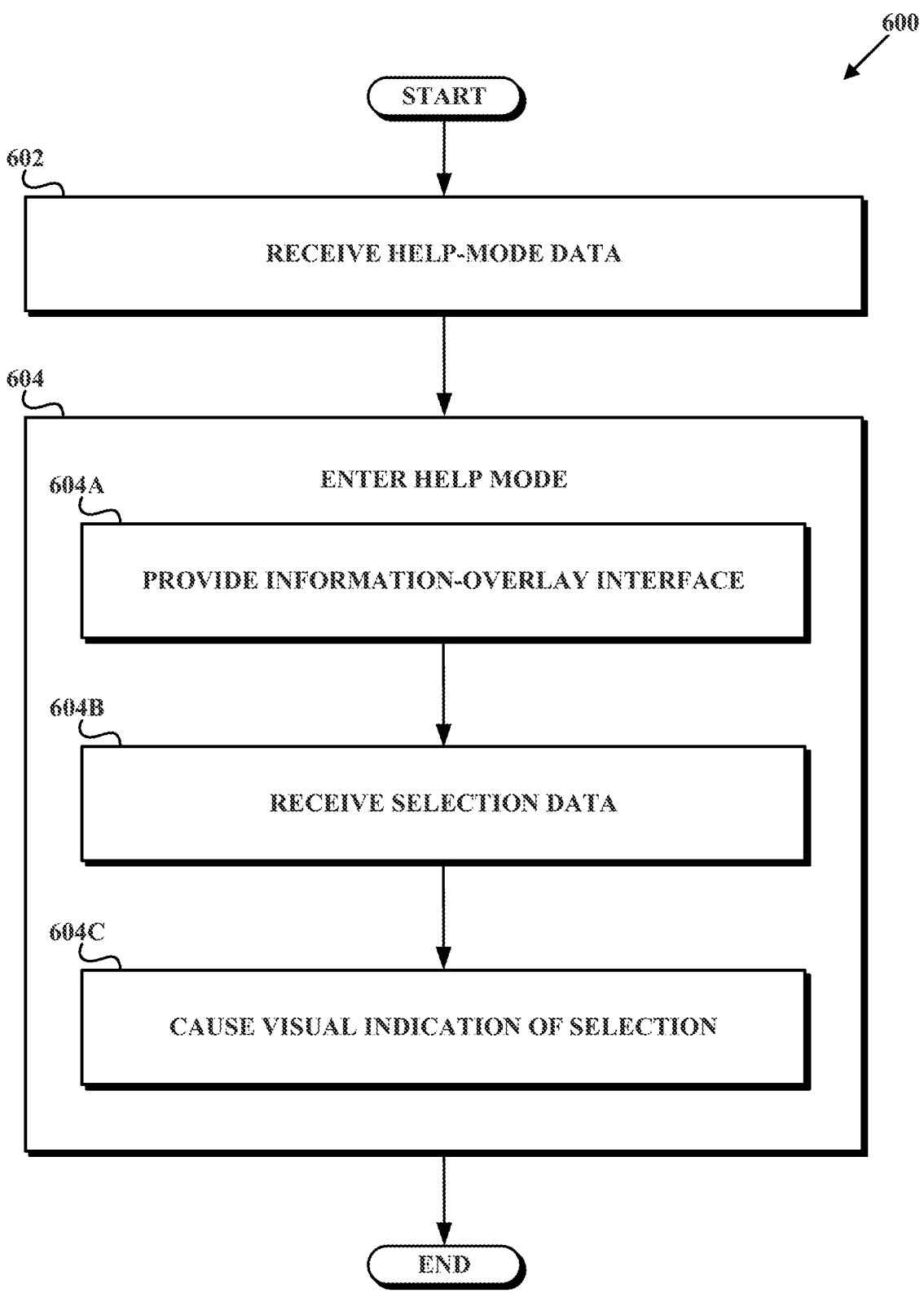
FIG. 6 is a simplified flow chart depicting aspects of an example method.
Figure 7:
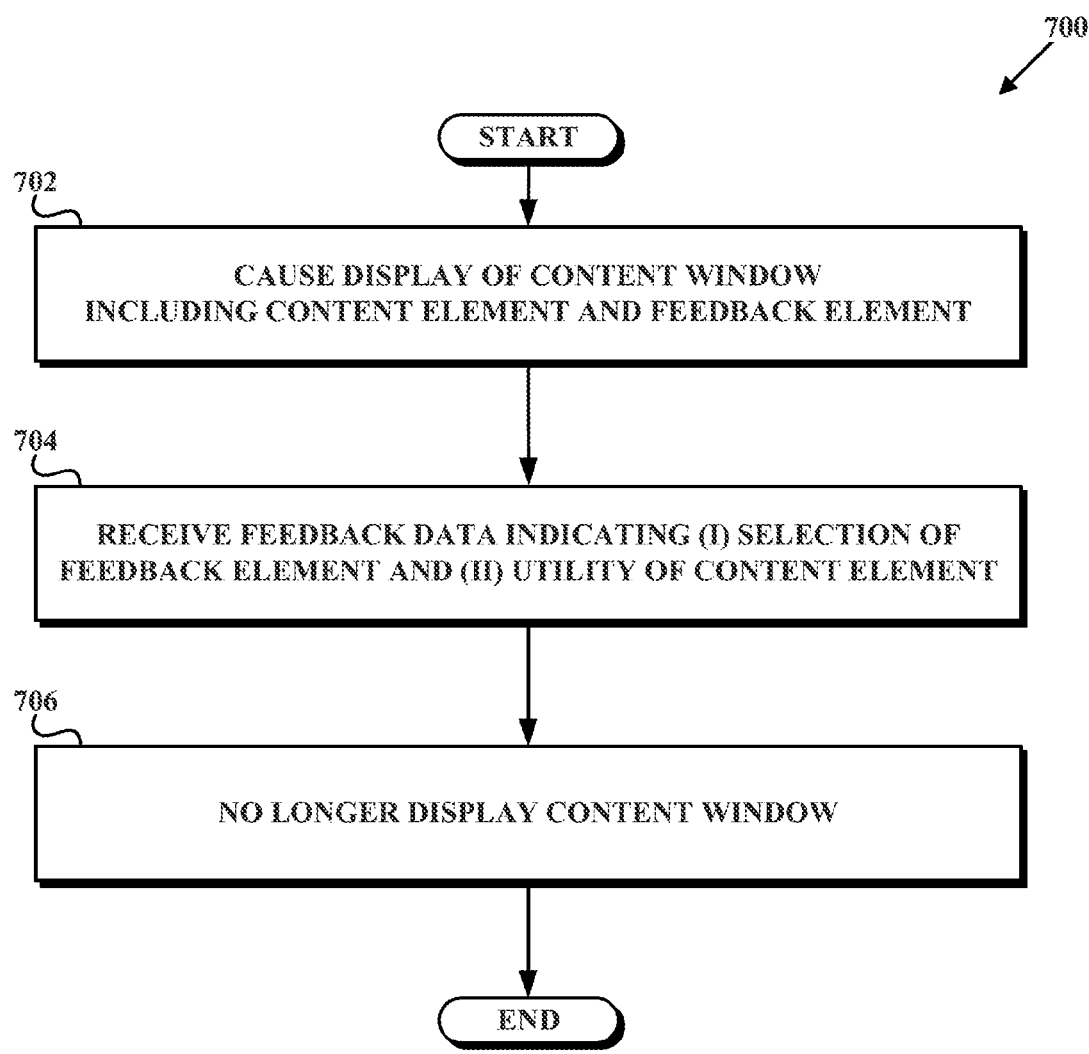
FIG. 7 is a simplified flow chart depicting aspects of an example method.

Server 106 may be any network server or other computing system arranged to carry out the server functions described herein including, but not limited to, those functions described with respect to FIGS. 5-7. As such, as shown in FIG. 3, server 106 may include processor 302, data storage 304 including program data 306 and program logic 308, and communication interface 310, all linked together via system bus, network, or other connection mechanism 312. Processor 302, data storage 304, program data 306, program logic 308, and communication interface 310 may be configured and/or arranged similar to processor 302, data storage 304, program data 306, program logic 308, and communication interface 310, respectively, as described above with respect to network-access device 102A.

Data storage 304 may contain information used by server 106 in operation. For example, date storage 304 may include instructions executable by the processor for carrying out the server functions described herein including, but not limited to, those functions described below with respect to FIGS. 5-7. As another example, data storage 304 may contain various design logic and/or design data used for determining a test result, such as the logic and data described below with respect to FIGS. 5-7. Generally, data storage 304 may contain information used by server 106 to provide an e-commerce storefront that is accessible by various network-access devices, such as network-access device 102A, over public network 104.

Returning to FIG. 1, public network 104 may include one or more wide area networks, one or more local area networks, one or more public networks such as the Internet, one or more private networks, one or more wired networks, one or more wireless networks, and/or one or more networks of any other variety. Devices in communication with public network 104 (including, but not limited to, network-access devices 102A-102D and server 106) may exchange data using a packet-switched protocol such as IP, and may be identified by an address such as an IP address.

Figure 4:
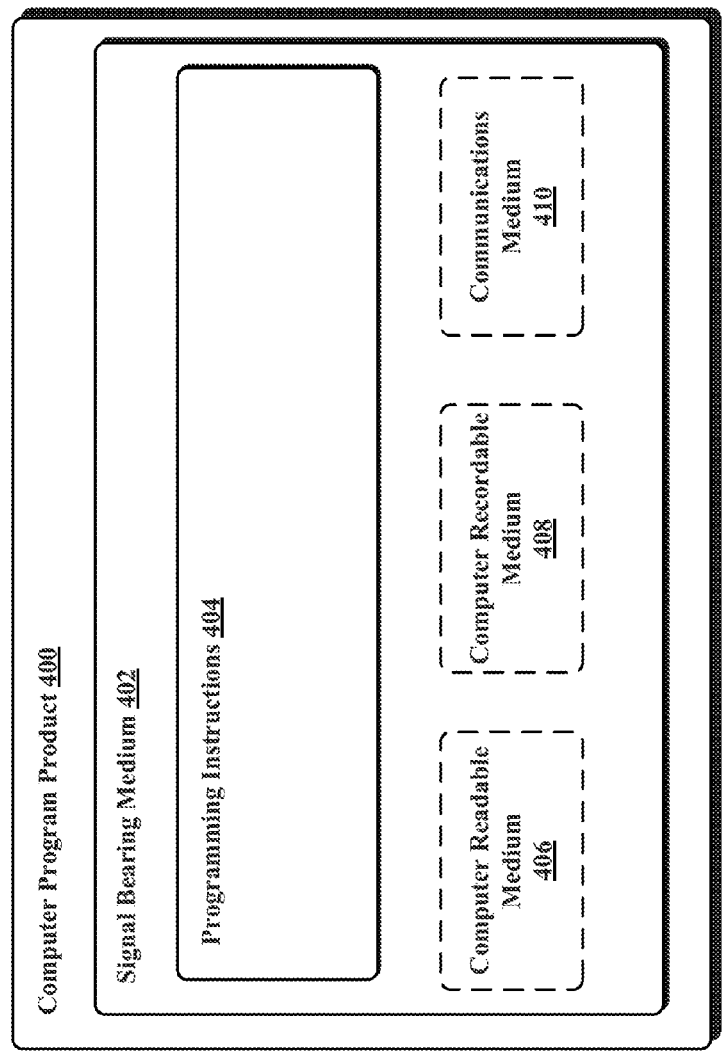
FIG. 4 depicts an example computer-readable medium arranged to implement aspects of at least one embodiment of the methods.

As noted above, in some embodiments, the disclosed methods may be implemented by computer program instructions encoded on a non-transitory computer-readable storage media in a machine-readable format, or on other non-transitory media or articles of manufacture. FIG. 4 is a schematic illustrating a conceptual partial view of an example computer program product that includes a computer program for executing a computer process on a computing device, arranged according to at least some embodiments presented herein.

In one embodiment, the example computer program product 400 is provided using a signal bearing medium 402. The signal bearing medium 402 may include one or more programming instructions 404 that, when executed by one or more processors may provide functionality or portions of the functionality described herein. In some examples, the signal bearing medium 402 may encompass a computer-readable medium 406, such as, but not limited to, a hard disk drive, a Compact Disc (CD), a Digital Video Disk (DVD), a digital tape, memory, etc. In some implementations, the signal bearing medium 402 may encompass a computer-recordable medium 408, such as, but not limited to, memory, read/write (R/W) CDs, R/W DVDs, etc. In some implementations, the signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, the signal bearing medium 402 may be conveyed by a wireless form of the communications medium 410. It should be understood, however, that computer-readable medium 406, computer recordable medium 408, and communications medium 410 as contemplated herein are distinct mediums and that, in any event, computer-readable medium 408 is a physical, non-transitory, computer-readable medium.

The one or more programming instructions 404 may be, for example, computer executable and/or logic implemented instructions. In some examples, a computing device such as the network-access device 102A of FIG. 2 may be configured to provide various operations, functions, or actions in response to the programming instructions 404 conveyed to the network-access device 102A by one or more of the computer readable medium 406, the computer recordable medium 408, and/or the communications medium 410.

The non-transitory computer readable medium could also be distributed among multiple data storage elements, which could be remotely located from each other. The computing device that executes some or all of the stored instructions could be a network-access device such as the network-access device 102A illustrated in FIG. 2. Alternatively, the computing device that executes some or all of the stored instructions could be another computing device, such as a server, for instance server 106 illustrated in FIG. 3.

2. EXAMPLE WEB-APPLICATION INTERFACE

FIGS. 5A, 5B, 6, and 7 each show simplified flow charts depicting aspects of example methods for selection-based contextual help retrieval as described herein. For purposes of example and explanation, aspects of such example methods are described with reference to an example web-application interface. It should be understood, however, that the example methods described herein may apply just as well to any suitable graphical user-interface including, but not limited to, any graphical user-interface implemented on a computer, mobile computing device, portable media player, gaming device, household appliance, office equipment, and/or other computing system.

Figure 8A:
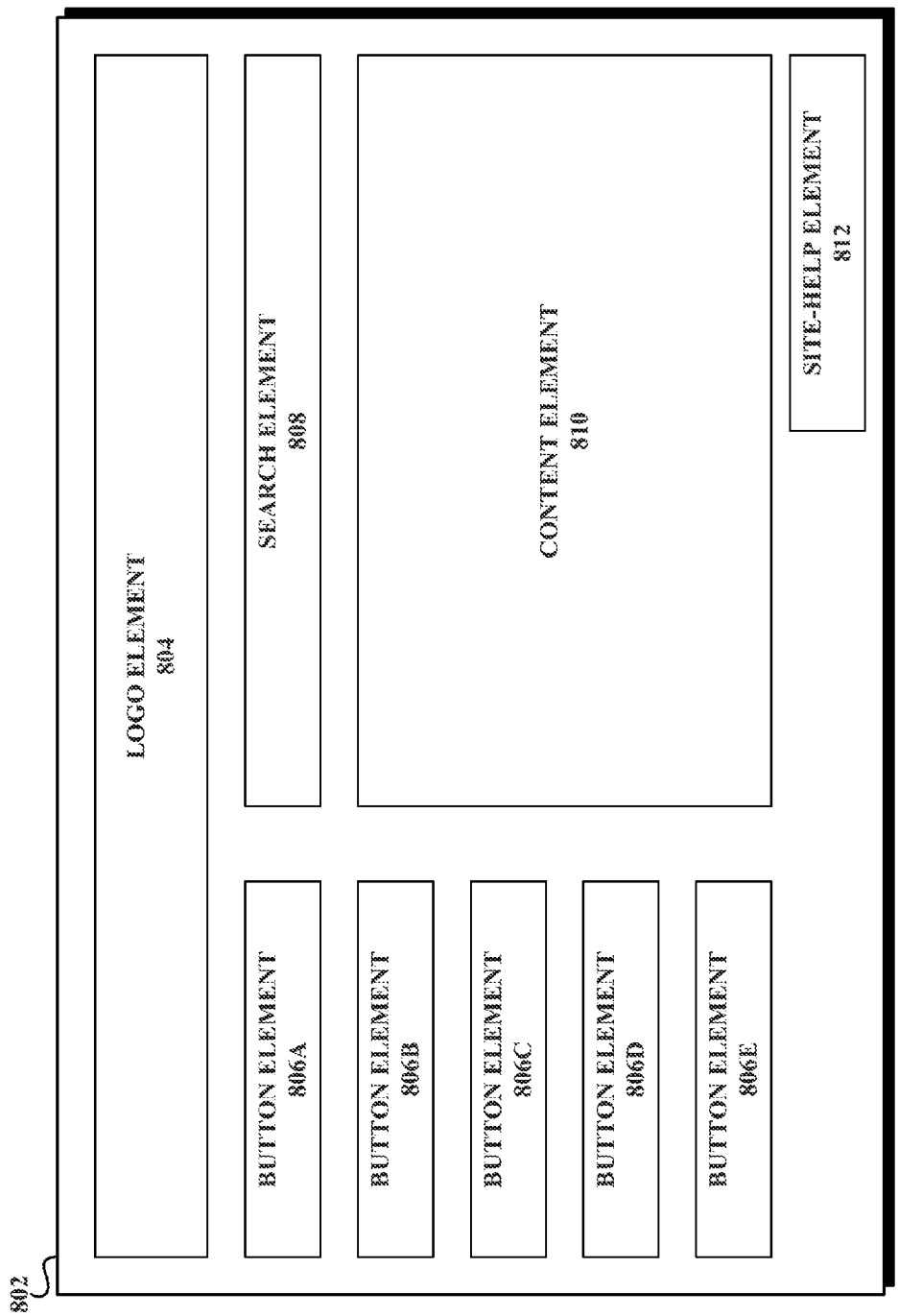
FIGS. 8A-8B depict aspects of an example graphical user-interface including various user-interface elements in accordance with an example method.
Figure 8B:
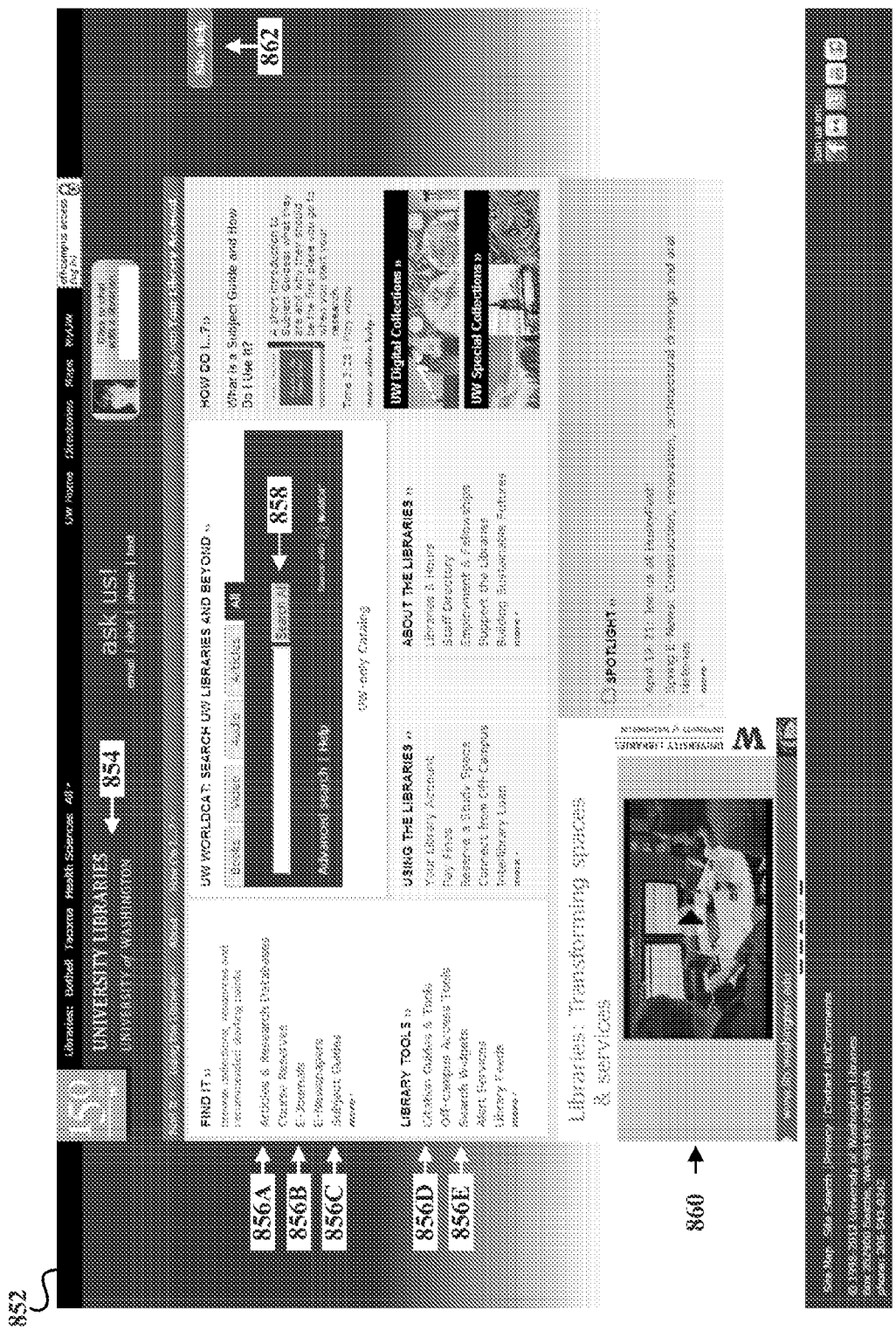

FIGS. 8A-8B depict aspects of an example graphical user-interface including various user-interface elements in accordance with an example method. More particularly, FIGS. 8A-8B depict aspects of an example web-application interface. FIG. 8A depicts a block diagram of interface elements included in the example web-application interface and FIG. 8B depicts a corresponding graphical web-application interface.

With respect to FIG. 8A, user-interface 802 includes a variety of user-interface elements. Such user-interface elements include logo element 804, button elements 806A-806E, search element 808, content element 810, and site-help element 812. Each user-interface element may generally possess various features, characteristics, and/or functionality. Further, while FIG. 8A depicts certain example user-interface elements, those of ordinary skill in the art will appreciate that other user-interface elements may exist. The user-interface elements depicted in FIG. 8A are for purposes of example and explanation only and should not be taken to be limiting.

With respect to FIG. 8B, user-interface 852 also includes a variety of user-interface elements, certain of which, for purposes of example and explanation, are noted as corresponding to the user-interface elements depicted in FIG. 8A. More particularly, logo element 854 generally corresponds to logo element 804. Button elements 856A-856E generally correspond respectively to button elements 806A-806E. Search element 858 generally corresponds to search element 810. And site-help element 852 generally corresponds to site-help element 812.

Various respective features, characteristics, and/or functionality of the user-interface elements depicted in FIGS. 8A and 8B are discussed further below with respect to the example methods described herein.

3. FIRST EXAMPLE METHOD

FIG. 5A shows a flowchart depicting functions that can be carried out in accordance with at least one embodiment of a first example method. As shown in FIG. 5A, method 500 begins at block 502 with a computing system receiving first-query data including contextual data, the contextual data indicating a user-interface element type, a user-interface element location, and user-interface element text. At block 504, the computing system determines at least one first-query response based on at least the contextual data. And at block 506, the computing system causes an indication of the determined at least one first-query response to be provided via an output device.

FIG. 5B shows a flowchart depicting additional functions that can be carried out in accordance with at least one embodiment of the first example method. In an embodiment, the functions depicted in FIG. 5B may be carried out after those functions depicted in FIG. 5A. As shown in FIG. 5B, method 510 begins at block 512 with a computing system receiving second-query data indicating a selection of one or more of the at least one first-query responses. At block 514, the computing system determines at least one second-query response based on the second-query data. And at block 516, the computing system causes an indication of the determined at least one second-query response to be provided via the output device.

The steps of method 500 and 510 are explained in the following subsections.

And although methods 500 and 510 may be carried out by server 106, this is not required. In some embodiments, methods 500 and 510 may be carried out entirely, or in part, by network-access device 102A or some other computing system that may or may not be communicatively coupled to any network.

a. Receive First-Query Data Including Contextual Data

At block 502, a computing system receives first-query data including contextual data, the contextual data indicating a user-interface element type, a user-interface element location, and user-interface element text.

As a general matter, the first-query data may be submitted to the computing system by a user of the user-interface as a result of the user interacting with the user-interface and/or, as will be discussed below, as a result of the user interacting with a "help mode" information-overlay interface corresponding to the user-interface. In any event, the user may generally identify a particular user-interface element that the user seeks help in connection with. For instance, with respect to FIG. 8A, the user may have a question regarding the function that button element 806A performs, and so the user may indicate button element 806A. Alternatively, the user may have a question regarding how search element 808 works, and so the user may indicate search element 808.

Further, it should be understood that, more generally, the user-interface element identified by the user may, or may not, be related to functionality the user is seeking help regarding. That is, the user-interface element need not be interactive elements of the user-interface. For instance, in an embodiment, with respect to FIG. 8A, the user may indicate logo element 804 if the user is seeking general information about the function, purpose, or some other general aspect of user-interface 802.

As noted, the first-query data received by the computing system includes contextual data. Such contextual data may generally be used by the computing system to analyze, identify, or otherwise evaluate the user-interface element indicated by the user and/or identify potential questions the user may have relative to the user-interface element. Accordingly, the contextual data may indicate certain information to facilitate such an analysis and/or identification including, for example, the user-interface element type, the user-interface element location within the user-interface hierarchy, and the user-interface element text. Those of ordinary skill in the art will appreciate that additional contextual data, examples of some of which are discussed below, may be analyzed by the computing system as well.

The user-interface element type may generally identify a type of the respective user-interface element. The type may indicate a categorization of the user-interface element, a file type of the user-interface element, or a purpose of the user-interface element, among other examples. In an embodiment, the type may correspond to a tag of the user-interface element. For instance, including but not limited to, a web-application embodiment, the type may correspond to a Document Object Model (DOM) object tag associated with the user-interface element. Examples of such DOM object tags include DIV, TABLE, and BUTTON, among other examples. Thus, the type of logo element 804 may be, for example, "graphic," ".jpg," or "logo." The type of any of button elements 806A may be, for example, "button," ".jpg," or "navigation." The type of search element 808 may be, for example, "input field" or "search." And the type of content element 810 may be, for example, "content," "text," or "information." Those of ordinary skill in the art will appreciate that additional user-interface element types may exist as well and that the examples provided herein should not be taken to be limiting. In particular, additional user-interface element types may exist in a web-application embodiment, and additional user-interface elements may exist in other user-interface embodiments as well.

The user-interface element location may generally identify a location of the user-interface element within the user interface. That is, the location may indicate a position, whether relative, absolute, or structural, of the user-interface element within the user interface. In an embodiment, including but not limited to, a web-application embodiment, the location may be the standard XPath string representation of the user-interface element. For instance, the location may include a sequence of tag names and child indices that indicate the path from the DOM tree to the selected user-interface element. Those of ordinary skill in the art will appreciate that additional approaches to indicating a user-interface element location may exist as well and that the examples provided herein should not be taken to be limiting.

The user-interface element text may generally indicate any text associated with the user-interface element in the underlying code of the user-interface. In an embodiment, including but not limited to, a web-application embodiment, the text may be visible text on the DOM node associated with the user-interface element. For instance, the text may include all of the text-node descendants of the selected node, concatenated into one string. Additionally, or alternatively, to the extent the user-interface element includes an ALT attribute (as is typically the case for image user-interface elements), the text of the ALT attribute may also be concatenated onto the user-interface element text. Those of ordinary skill in the art will appreciate that additional user-interface element text may exist as well and that the examples provided herein should not be taken to be limiting.

Those of ordinary skill in the art will also appreciate that other contextual data may be utilized by the computing system as well. As one example of such additional contextual data, the computing system may evaluate a user-interface element style associated with the user-interface element. The style may include, for example, an identification of a color, size, and/or shape, among other style properties, of the user-interface element.

For purposes of example and explanation, the user-interface may be configured or otherwise arranged to be capable of entering a "help mode" where normal operation of the user-interface may be suspended and the user is able to submit the first-query data to the computing system. In an embodiment, such a help mode may be entered in response to selection of site-help element 812, which may take the form of a button.

Thus, before receiving the first-query data, the computing system may receive help-mode data indicating a user-preference to enter a help mode. In an embodiment, the help-mode data may correspond to the selection of a help-mode element on the user-interface such as site-help element 812 in FIG. 8A. Note that site-help element 862 in FIG. 8B generally corresponds to site-help element 812.

However, additionally or alternatively, the help-mode data may correspond to a key event, such as the selection of a particular key on a keyboard associated with the help mode. And, additionally or alternatively still, the help mode data may correspond to an input gesture, such as a particular movement of a mouse cursor associated with the help mode. The key event and/or input gesture may provide a more efficient, convenient, and/or intuitive technique for entering the help mode than does selection of site-help element 812.

Figure 9A:
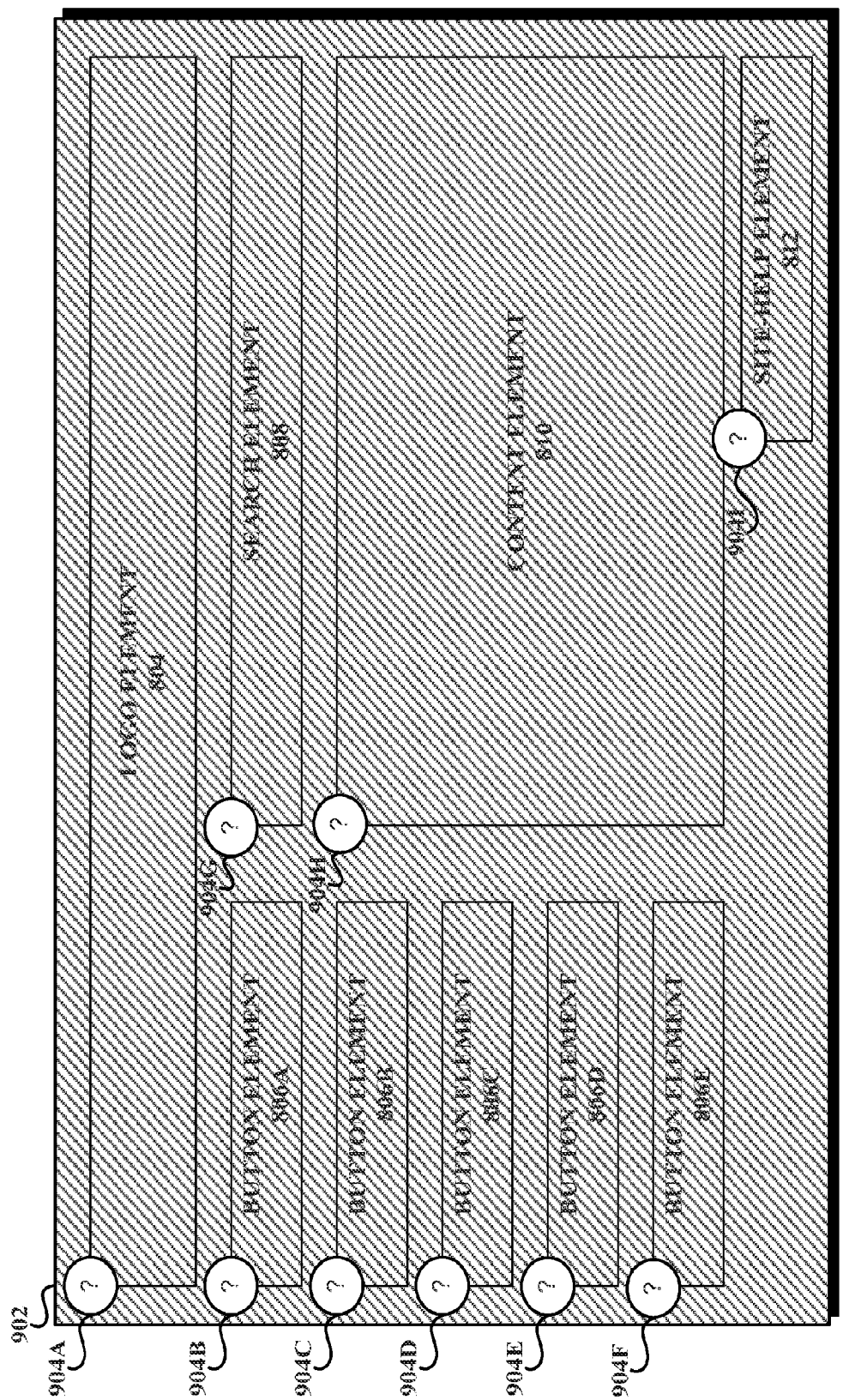
FIGS. 9A-9B depict aspects of an example information-overlay interface in accordance with an example method.
Figure 9B:
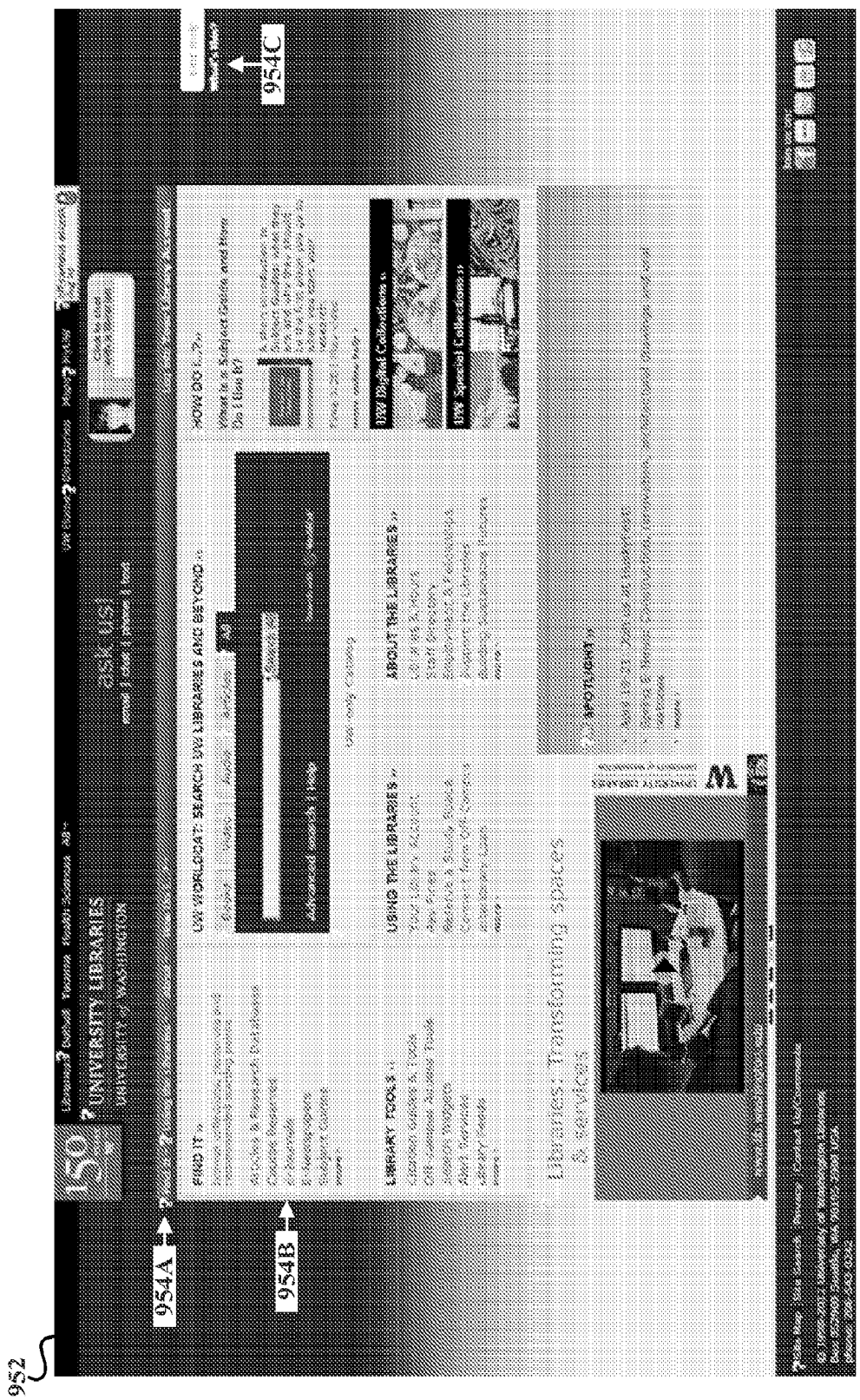

As will be discussed further below, entering the help mode may involve providing an information-overlay interface that corresponds to the graphical-user interface. Accordingly, FIGS. 9A-9B depict aspects of an example information-overlay interface in accordance with the example methods described herein. FIG. 9A depicts a block diagram of an example information-overlay interface and FIG. 9B depicts a corresponding graphical web-application information-overlay interface.

With respect to FIG. 9A, user-interface 902 is shown. User-interface 902 includes an information-overlay layer that has caused user-interface 802 to "dim." Such a dimming effect may generally indicate that the help mode has been entered, and that normal operation of the user-interface has been suspended. Further, user-interface 902 may include various information-overlay-interface elements (not shown), each corresponding to a respective user-interface element of user interface 802. Such information-overlay-interface elements may not be initially apparent (and may become apparent upon a user moving a mouse cursor over the information-overlay-interface element, as discussed further below). But, nonetheless, user-interface 902 may indicate the presence of such information-overlay-interface elements by way of various visual indications 904A-904l of an identification of respective information-overlay elements.

With respect to FIG. 9B, user-interface 952 also includes an information-overlay layer that has caused user-interface 852 to "dim" (as also discussed above with respect to FIG. 8B). For purposes of example and explanation, visual indications 954A and 954B generally correspond to visual indications 904A-904l. Other such visual indications are shown in user-interface 952. And although the visual indications are generally shown as taking the form of question marks, those of skill in the art will appreciate that such visual indications may take any other suitable form as well.

The information-overlay layer, such as that depicted in FIGS. 9A and 9B, is discussed in greater detail below.

Figure 10A:
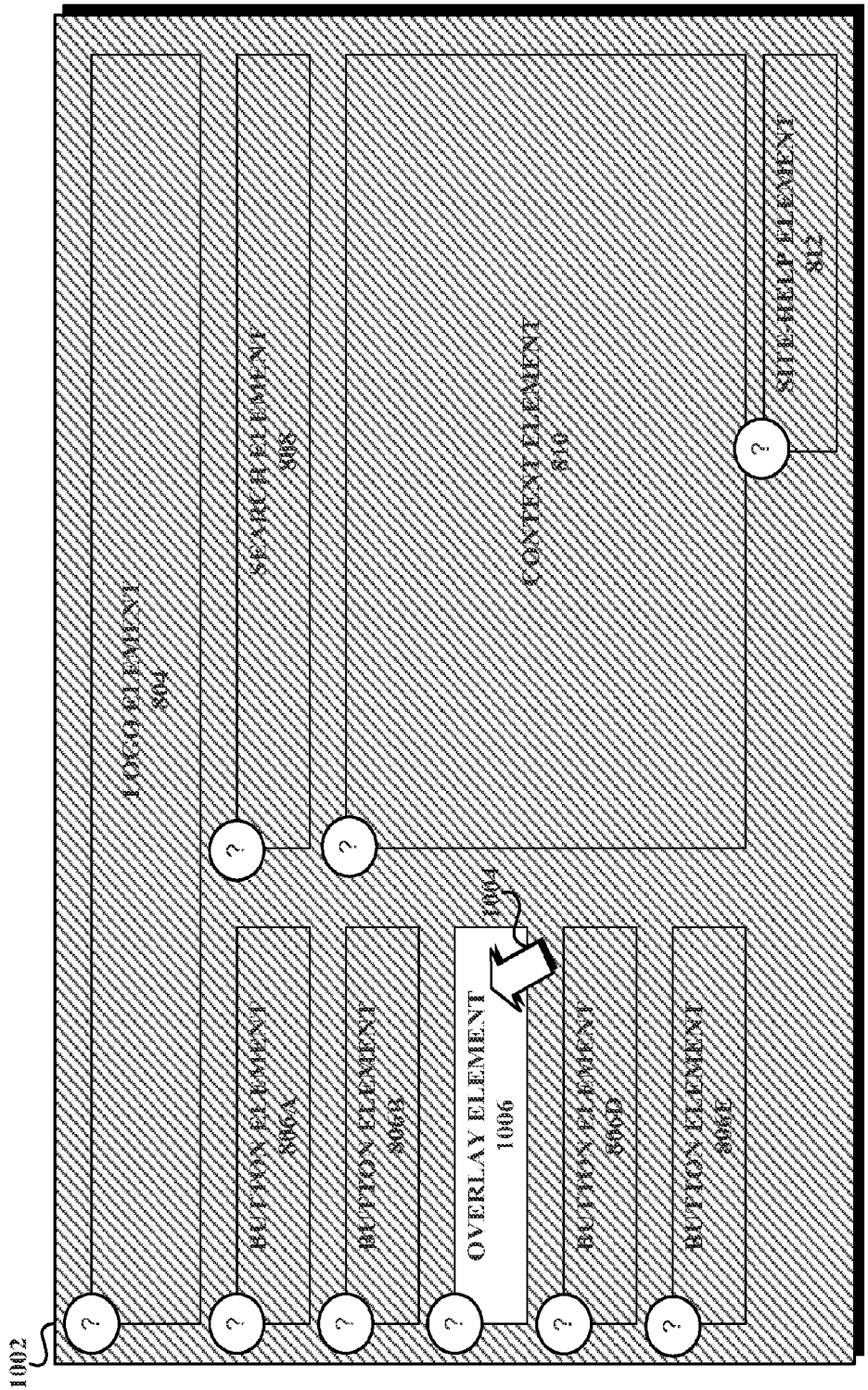
FIGS. 10A-10B depict aspects of an information-overlay-interface elements in accordance with an example method.
Figure 10B:

As noted above, the computing system may receive the first-query data including the contextual data as the result of the user identifying a particular user-interface element that the user seeks help in connection with. Accordingly, FIGS. 10A-10B depict aspects of information-overlay-interface elements in accordance with the example methods described herein. More particularly, FIGS. 10A-10B depict the indication of an information-overlay-interface element that corresponds to a respective graphical user-interface element.

FIG. 10A depicts a block diagram of the information-overlay-interface elements and FIG. 10B depicts corresponding graphical web-application information-overlay-interface elements.

With respect to FIG. 10A, user-interface 1002 is shown. User-interface 1002 includes information-overlay-interface element 1006 that has been made visible as a result of the user moving mouse cursor 1004 over information-overlay-interface element 1006 (and corresponding button element 806C). In the example depicted in FIG. 10A, overlay element 1006 appears to highlight button element 806C.

With respect to FIG. 10B, user interface 1052 is shown. User-interface 1052 includes information-overlay-interface element 1054, corresponding, for purposes of example and explanation, to information-overlay-interface element 1006, which has been made visible as a result of a user moving a mouse cursor (not shown) over information-overlay-interface element 1054. In the example depicted in FIG. 10B, the button element corresponding to information-overlay-interface element 1054 appears to be highlighted. Those of skill in the art will appreciate that, while the information-overlay-interface elements depicted in FIGS. 10A-10B cause their respective corresponding graphical-user-interface elements to appear highlighted, the existence of such information-overlay-interface elements may be indicated in a number of alternative suitable manners. In one alternative embodiment, for example, the corresponding graphical-user-interface element may appear to be underlined in addition to, or instead of, highlighted.

In any event, the user may indicate a particular user-interface element that the user seeks help in connection with by selecting the corresponding information-overlay-interface element, and thereby cause the computing system to receive first-query data including contextual data, the contextual data indicating the user-interface element type, the user-interface element location, and user-interface element text. Such a selection may be executed by, for example, clicking on the information-overlay-interface element, placing the mouse cursor on the information-overlay-interface element for a predetermined amount of time, and/or any other suitable selection technique as will be appreciated by those with ordinary skill in the art.

b. Determine at Least One First-Query Response

At block 504, the computing system determines at least one first-query response based on at least the contextual data. That is, the computing system determines at least one first-query response based on at least the user-interface element type, a user-interface element location, and user-interface element text of the user-interface element indicated by the user.

The first-query responses may generally correspond to questions associated with parts, aspects, and/or features of the user-interface element. Such first-query responses, or questions, may be stored by the computing system, either locally or remotely, in a database or other suitable storage arrangement. As a general matter, the contextual data may be used to identify first-query responses that are associated with the user-interface element.

The first-query responses may be ordered based on a predicted relevance to the help the user is seeking. Thus, the computing system may determine an order of the determined at least one first-query response based on a respective relevance of each determined at least one first-query response. The computing system may leverage the contextual data, i.e., the user-interface element type, the user-interface element location, and the user-interface element text to help determine the respective relevance of each first-query response. More particularly, the computing system may determine a context score for each first-query response that corresponds to the predicted relevance of the first-query response to the help the user is seeking.

Determining a respective context score for each determined at least one first-query response may involve determining the respective context score based on at least one of an element-type metric, an element-location metric, and an element-text metric. The computing system may then determine the respective relevance of each determined at least one first-query response based on at least the respective context score. As a general matter, the relevances and/or context scores may be determined based on any suitable contextual data described above.

The element-type metric may be determined or calculated based on a relevance of the user-interface element type to the first-query response. In an embodiment, the computing system may store, for each first-query response, the user-interface element types that are associated with the first-query response. Accordingly, if the user-interface element type indicated in the contextual data is present in the user-interface element types associated with the first query response, the element-type metric may be set to 1. On the other hand, if the user-interface element type indicated in the contextual data is not present in the user-interface element types associated with the first query response, the element-type metric may be set to 0.

The element-location metric may be determined or calculated based on a relevance of the user-interface element location to the first-query response. In an embodiment, the computing system may store, for each first-query response, the user-interface element locations that are associated with the first-query response. Accordingly, the element-location metric may represent the similarity of the location of the user-interface element location indicated in the contextual data and the location(s) associated with the first-query response. In an example, the computing system may calculate a percent similarity between the two locations. For instance, in an embodiment where the locations are indicated using XPaths, the computing system may start from the root of the XPath and do a node-by-node string equality comparison to determine how much overlap there is between the two XPaths. Thus, the element-location metric may be set to a value between 0 and 1, the value corresponding to the calculated percent similarity between the two locations.

The element-text metric may be determined or calculated based on a relevance of the user-interface element text to the first-query response. In an embodiment, the computing system may store, for each first-query response, the text of the first-query response. Accordingly, the element-text metric may represent the similarity of the text of the user-interface element text indicated in the contextual data and the text of the first-query response. In an example, the computing system may perform a string contains operation to determine whether the user-interface element text is present in the text of the first-query response. If the user-interface element text is present in the text of the first-query response, the element-text metric may be set to 1. On the other hand, if the user-interface element text is not present in the text of the first-query response, the element-text metric may be set to 0.

As noted, the respective context score may be determined based on some combination of the element-type metric, the element-location metric, and the element-text metric. For instance, the context score may be the addition, product, or some other combination of each metric.

In an embodiment, determining the respective context score may involve determining the respective context score based on at least a weighted average of the element-text metric, the element-location metric, and the element-type metric. In a particular example, each metric may be weighted by a value between 0 and 1, and the weighted metrics may then be added. For instance, the element-type metric may be weighted by 0.1, the element-location metric may be weighted by 0.2, and the element-text metric may be weighted by 0.7. Those of ordinary skill in the art will appreciated that other suitable weight combinations may be used as well.

In addition to the contextual data, the first-query data may also include search-term data that indicates at least one search term. The search-term data may be provided by the user by inputting the at least one search term into a text-input box and submitting the at least one search term to the computing system. As a general matter, the search terms may reflect a key phrase, or search phrase, corresponding to the help that the user is seeking.

Accordingly, determining the at least one first-query response may involve determining the at least one first-query response based on at least the contextual data and the search-term data. Additionally, determining the respective relevance of each determined at least one first-query response may involve determining the respective relevance of each determined at least one first-query response based on at least the context score and a text-similarity score. The text similarity score may be determined or calculated based on a relevance of the at least one search term to the first-query response. As noted, in an embodiment, the computing system may store, for each first-query response, the text of the first-query response. Accordingly, the text-similarity score may represent the similarity of the at least one search term and the text of the first-query response. In an example, the computing system may compare the at least one search term with the text of the first-query response using a search index of the text of the first-query response. The text-similarity score may then reflect the frequency with which the at least one search term appears in the text of a given first-query response compared to the text of all other first-query responses. Those of skill in the art will appreciate that other text search techniques may be used to determine or calculate the text-similarity score.

Further, in an embodiment, the first-query responses may be ordered based on additional information as well. Such additional information may include the web-browser in which the user-interface is accessed and/or a uniform resource locator (URL) associated with the user-interface.

c. Cause an Indication of the Determined at Least One First-Query Response to be Provided At block 506, the computing system causes an indication of the determined at least one first-query response to be provided via an output device. In one embodiment, the indication may be a visual indication and the output device may be a graphical display. However, this is not necessary. In an alternative embodiment the indication may be an audible indication and the output device may be a speaker (e.g., in the form of a free standing speaker, headphones, etc.). Note that the output device may be located locally (i.e., attached) or remote (i.e., networked) to the computing system carrying out method 500.

Figure 11A:
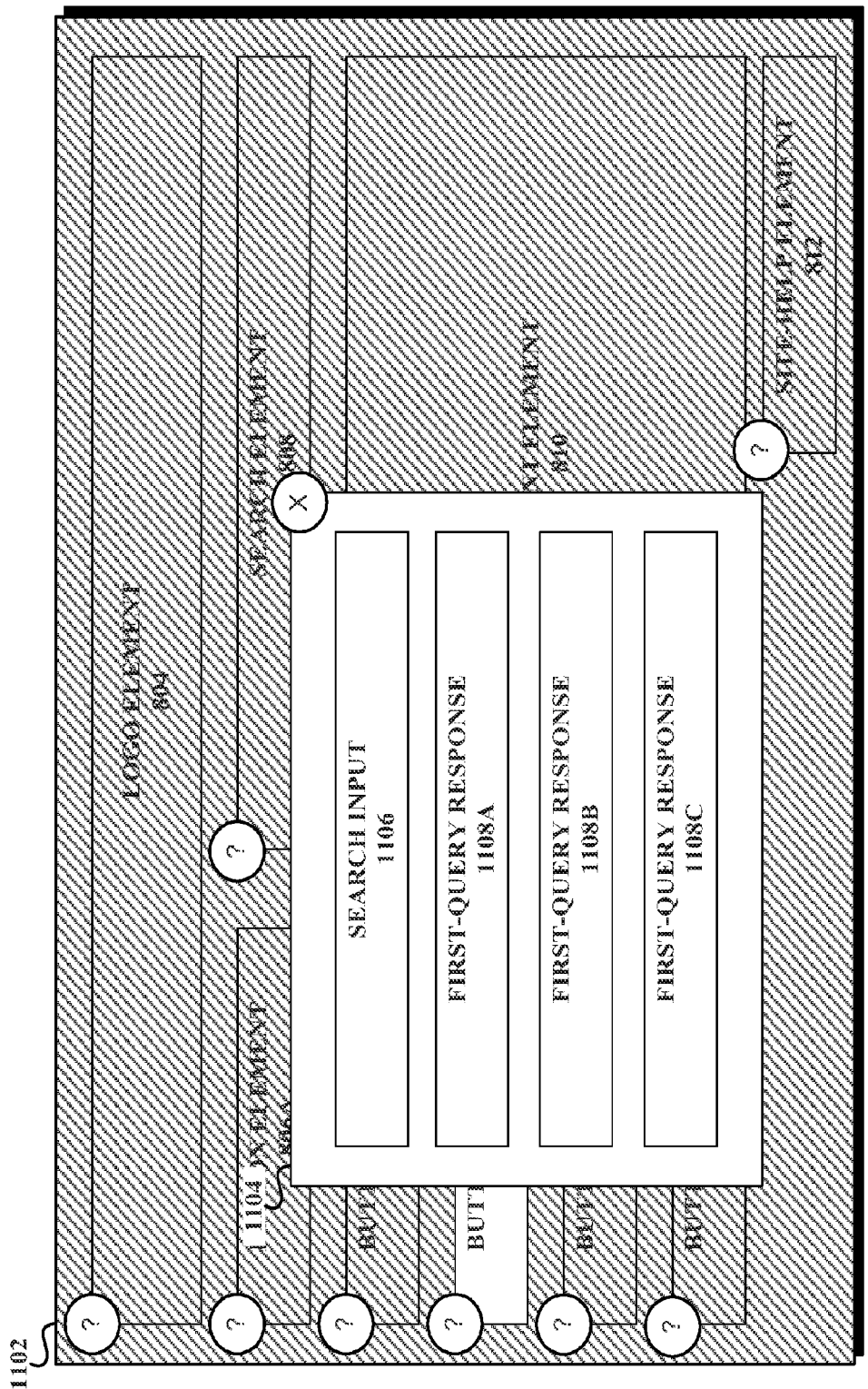
FIGS. 11A-11B depict example first-query responses in accordance with an example method.
Figure 11B:
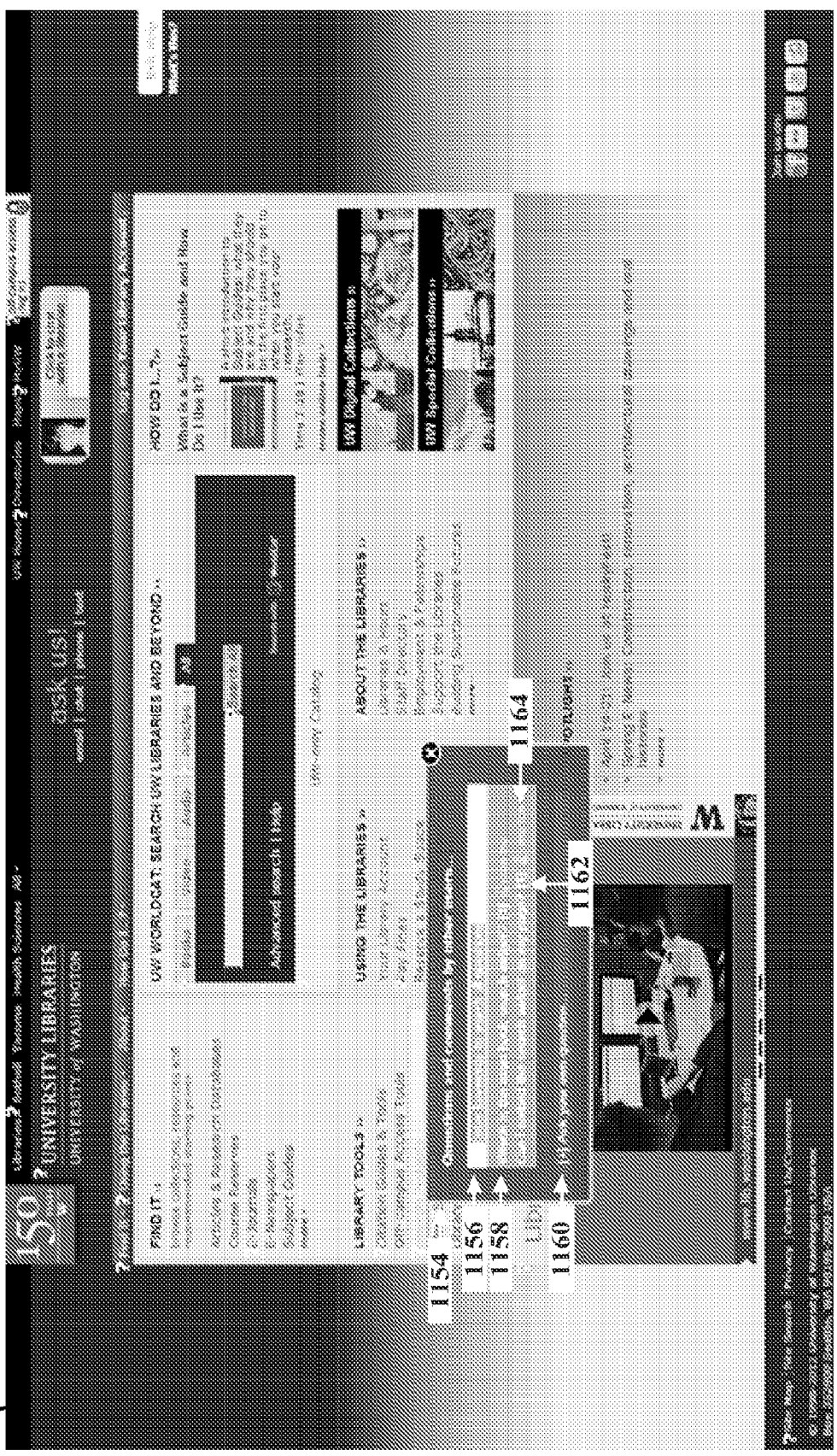

With respect to a visual indication of the at least one first-query response, FIGS. 11A-11B depict example first-query responses in accordance with the example methods described herein. FIG. 11A depicts a block diagram of example first-query responses and FIG. 11B depicts corresponding example first-query responses within a graphical web-application interface.

With respect to FIG. 11A, user-interface 1102 includes content box 1104 including search input field 1106 and example first-query responses 1108A-1008C. Example first-query responses 1108A-1008C may be first-query responses determined in accordance with block 504 as described above. Further, first-query responses 1108A-1108C may be ordered based on relevance in accordance with block 504 as described above. And while three first-query responses are depicted in the example shown in FIG. 11A, this is not necessary. Any suitable number of first-query responses may be displayed. Further, while, as described above, each first-query response may generally correspond to a question predicted to be relevant to the help sought by the user, it is possible that the computing system may not possess, or may not have stored, any such first-query responses or questions. In such a case, the first-query response may indicate that no relevant questions exist in the system.

Search input 1106 may be a text-input box that the user may use to submit at least one search term to the computing system as described above with respect to block 504. In the event that first-query responses 1108A-1108C are displayed prior to the user inputting a search term into search input 1106, the first-query responses 1108A-1008C may be updated based on the search term input into search input 1106.

With respect to FIG. 11B, user-interface 1152 includes, for purposes of example and explanation, content box 1154 generally corresponding to content box 1104, search input field 1156 generally corresponding to search input field 1106, and example first-query response 1158 which generally corresponds to any one of example first-query responses 1108A-1108C.

Content box 1154 also includes "ask your own question" button 1160, whereby a user may select button 1160 and input a new question, or first-query response, into the computing system. Accordingly, the computing system may receive question data indicating a question associated with a given user-interface element. The computing system may also cause the question data to be stored as a first-query response.

Content box 1154 also includes various answer indicators 1162, each associated with a respective first-query response, that indicate whether the computing system has available, for the respective first-query response (or question) an associated answer (or second-query response). Second-query responses, or answers, are discussed further below.

Content box 1154 also includes various "me too" buttons 1164, whereby a user may indicate that the user has the same, or similar question. In this way, the computing system may track which questions are most common to users, and potentially use such information as an additional basis for determining the respective relevance of each question (or first-query response).

Context box 1154 may include additional features as well. For instance, context box 1154 may include various subscription buttons, each associated with a particular question. A user may then "subscribe" to a question and be alerted, perhaps by email or instant message, once a new answer to the question becomes available. Further, context box 1154 may include various spam buttons, each associated with a particular question. A user may then "flag" a particular question as spam, and an administrator of the user-interface may evaluate the flagged question for potential removal.

d. Receive Second-Query Data

At block 512, the computing system receives second-query data indicating a selection of one or more of the at least one first-query responses. For example, the user may select one of first-query responses 1108A-1108C. The selected first-query response may reflect a question that is relevant to the help sought by the user. As a result of selecting the first-query response the user may submit to the computing system the second-query data indicating the selection of the first-query response.

e. Determine at Least One Second-Query Response

At block 514, the computing system determines at least one second-query response based on the second-query data. That is, the computing system determines at least one second-query response based on at least the first-query response, or question, indicated by the second-query data.

The second-query responses may generally correspond to answers associated with the selected first-query response, or question. Such second-query responses, or answers, may be stored by the computing system, either locally or remotely, in a database or other suitable storage arrangement. As a general matter, the selected first-query response may be used to identify the appropriate second query response. In an embodiment, for example, the computing system will store in an association database the second-query responses (or answers) that are associated with each first-query response (or question) for efficient reference and retrieval.

Like the first-query responses, the second-query responses may be ordered based on a predicted relevance to the help the user is seeking. Thus, the computing system may determine an order of the determined at least one second-query response based on a respective relevance of each determined at least one second-query response.

Determining an order of the determined at least one second-query response based on a respective relevance of each determined at least one second-query response, may involve determining the respective relevance of each determined at least one second-query response based on at least an identity of an author of each determined at least one second-query response. For instance, the computing system may store the identity of the author of each second-query response, or answer. The computing system may also store an indication of the experience, status, and/or other such indication of the prestige of the author of the second-query response. Those second-query responses authored by authors deemed to have a relatively higher prestige may be determined to have a relatively higher relevance.

f. Cause an Indication of the Determined at Least One Second-Query Response to be Provided At block 516, the computing system causes an indication of the determined at least one second-query response to be provided via the output device. In one embodiment, the indication may be a visual indication and the output device may be a graphical display. However, this is not necessary. In an alternative embodiment the indication may be an audible indication and the output device may be a speaker (e.g., in the form of a free standing speaker, headphones, etc.) Note that the output device may be located locally (i.e., attached) or remote (i.e., networked) to the computing system carrying out method 510.

Figure 12A:
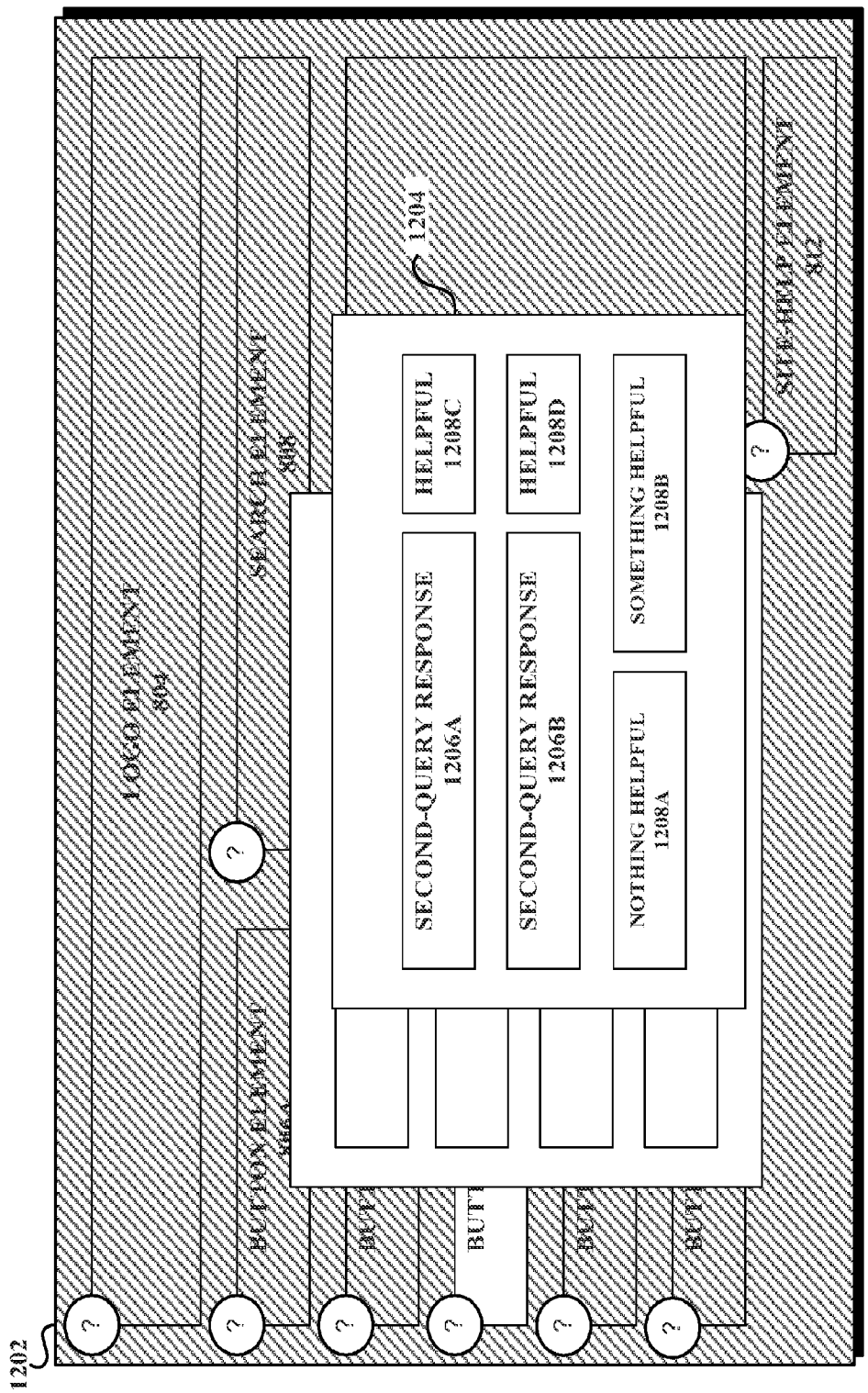
FIGS. 12A-12B depict example second-query responses in accordance with an example method.
Figure 12B:
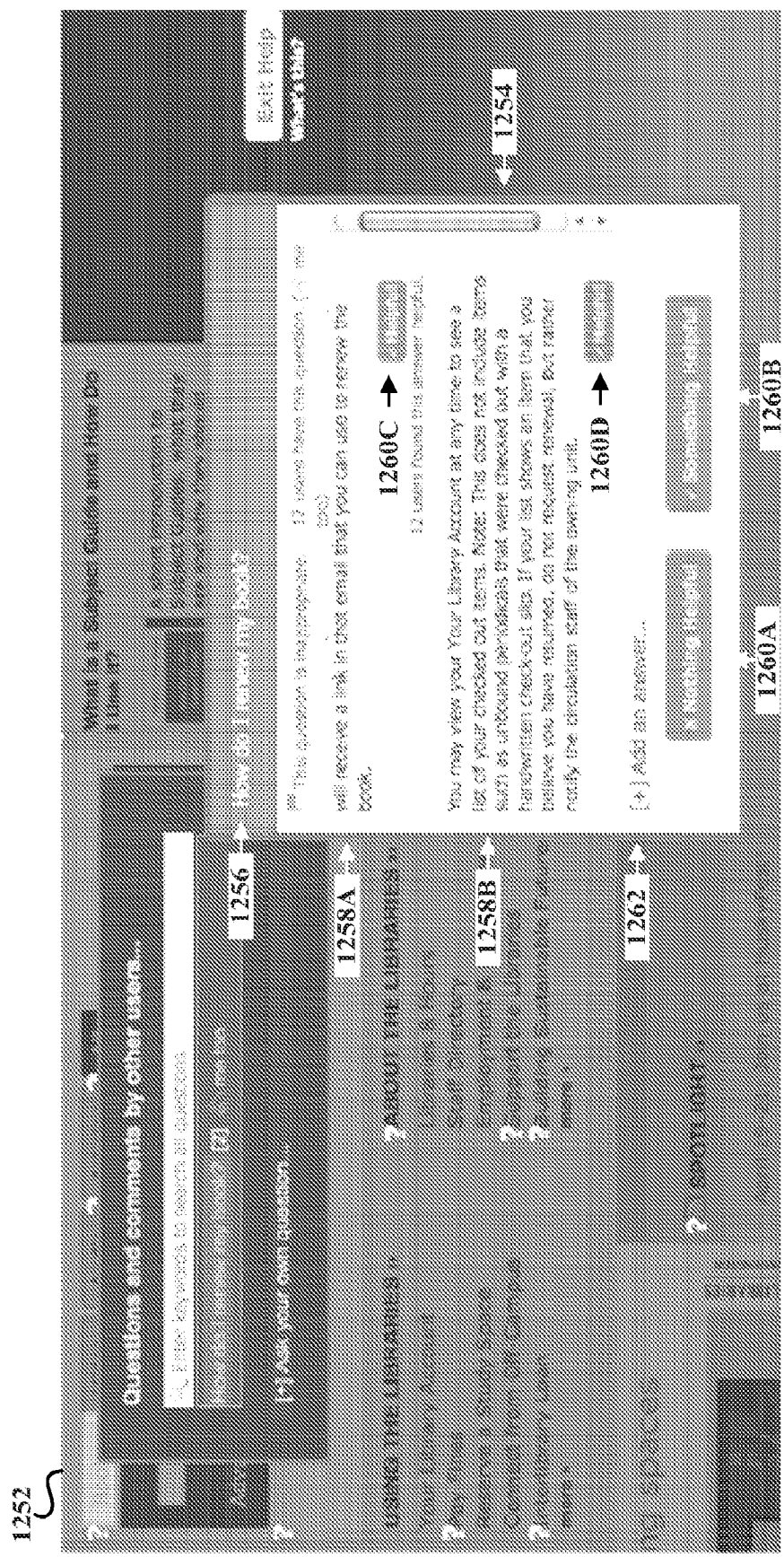

With respect to a visual indication of the at least one second-query response FIGS. 12A-12B depict example second-query responses in accordance with the example methods described herein. FIG. 12A depicts a block diagram of example second-query responses and FIG. 12B depicts corresponding example second-query responses within a graphical web-application interface.

With respect to FIG. 12A, user-interface 1202 includes content box 1204 including example second-query responses 1206A-1206B and helpfulness buttons 1208A-1208D. Example second-query responses 1206A-1206B may be second-query responses determined in accordance with block 514 as described above. Further, second-query responses 1206A-1206B may be ordered based on relevance in accordance with block 514 as described above. And while two second-query responses are depicted in the example shown in FIG. 12A, this is not necessary. Any suitable number of second-query responses may be displayed. Further, while, as described above, each second-query response may generally be an answer to the first-query response, or question, selected by the user, it is possible that the computing system may not possess, or may not have stored, any such second-query responses or answers. In such a case, the second-query response may indicate that no relevant answers exist in the system. In the event that the second-query response is an indication that no relevant answers exist in the system, the user may submit to the computing system answer-needed data, perhaps by way of a button or other input element, indicating that an answer corresponding to the first-query response is needed.

Helpfulness buttons 1208A-1208D may be selectable by the user and may function to provide an indication of the helpfulness (or lack thereof) of a particular second-query response, or answer. Accordingly in an embodiment, a particular helpfulness button, such as any of helpfulness buttons 1208A-1208D may be associated with a particular second-query response, or may be associated with a group of second-query responses. For instance, "nothing helpful" button 1208A may indicate that second-query responses 1206A-1206B contain nothing helpful. "Something helpful" button 1208B may indicate that, among the information provided by second-query responses 1206A-1206B, there was some helpful information. "Helpful" button 1208C may indicate that second-query response 1206A, in particular, was helpful. And "Helpful" button 1208D may indicate that second-query response 1206B, in particular, was helpful. Thus, after causing the indication of the determined at least one second-query response to be provided, the computing system may receive helpfulness data indicating an extent to which the at least one second-query response was helpful.

With respect to FIG. 12B, user-interface 1252 includes, for purposes of example and explanation, content box 1254 generally corresponding to content box 1204, example second-query responses 1258A-1258B which generally correspond to example second-query responses 1206A-1206B, and helpfulness buttons 1260A-1260D generally corresponding to helpfulness buttons 1208A-1208D. Content box 1254 also includes an indication of the selected first-query response 1256, for the user's reference.

Context box 1262 also includes "add an answer" button 1262, whereby a user may select button 1262 and input a new answer, or second-query response, into the computing system. Accordingly, the computing system may receive answer data indicating an answer associated with a given first-query response, or question. The computing system may also cause the answer data to be stored as a second-query response.

Further, as noted above, the answer data may further indicate an author of the answer. Correspondingly, an indication of the experience, status, and/or other such indication of the prestige of the author the second-query response may be modified based on the helpfulness rating of the provided answer. The helpfulness rating may change based on helpfulness data received as a result of use of helpfulness buttons 1260A-1260D as described above.

4. SECOND EXAMPLE METHOD

FIG. 6 shows a flowchart depicting functions that can be carried out in accordance with at least one embodiment of a second example method. As shown in FIG. 6, method 600 begins at block 602 with a computing system receiving help-mode data indicating a user-preference to enter a help mode corresponding to a graphical user-interface including at least one graphical-user-interface element. At block 604, the computing system enters the help mode corresponding to the graphical user-interface. The help mode includes, at block 604A, providing an information-overlay interface corresponding to the graphical user-interface, where the information-overlay interface includes at least one information-overlay-interface element corresponding to at least one respective graphical-user-interface element. The help mode also includes, at block 604B, receiving selection data indicating a selection of the at least one information-overlay-interface element. And the help mode also includes, at block 604C, causing a visual indication of the selection of the at least one information-overlay-interface element to be displayed on a graphical display. The steps of method 600 are explained in the following subsections.

And although method 600 may be carried out by server 106, this is not required. In some embodiments, method 600 may be carried out entirely, or in part, by network-access device 102A or some other computing system that may or may not be communicatively coupled to any network.

a. Receive Help-Mode Data

At block 602, a computing system receives help-mode data indicating a user-preference to enter a help mode corresponding to a graphical user-interface including at least one graphical-user-interface element. In an embodiment, the help-mode data may correspond to the selection of a help-mode element on the user-interface such as site-help element 812 in FIG. 8A. Note that site-help element 862 in FIG. 8B generally corresponds to site-help element 812.

However, additionally or alternatively, the help-mode data may correspond to a key event, such as the selection of a particular key on a keyboard associated with the help mode. And, additionally or alternatively still, the help mode data may correspond to an input gesture, such as a particular movement of a mouse cursor associated with the help mode. The key event and/or input gesture may provide a more efficient, convenient, and/or intuitive technique for entering the help mode than does selection of site-help element 812.

b. Enter Help Mode

At block 604, the computing system enters the help mode corresponding to the graphical user-interface.

i. Provide Information-Overlay Interface

The help mode includes, at block 604A, providing an information-overlay interface corresponding to the graphical user-interface, where the information-overlay interface includes at least one information-overlay-interface element corresponding to at least one respective graphical-user-interface element. As noted above, FIGS. 10A-10B depict the indication of an information-overlay-interface element that corresponds to a respective user-interface element. FIG. 10A depicts a block diagram of the information-overlay-interface elements and FIG. 10B depicts corresponding graphical web-application information-overlay-interface elements.

With respect to FIG. 10A, user-interface 1002 is shown. User-interface 1002 includes information-overlay-interface element 1006 that has been made visible as a result of the user moving mouse cursor 1004 over information-overlay-interface element 1006 (and corresponding button element 806C). Similar such information-overlay-interface elements may exist that correspond to the other graphical-user-interface elements in user-interface 1002 including, for example, any of logo element 804, button elements 806A-806E, search element 808, content element 810, and/or site-help element 812.

ii. Receive Selection Data

The help mode also includes, at block 604B, receiving selection data indicating a selection of the at least one information-overlay-interface element. However, as noted above, before receiving the selection data, the computing system may cause a visual indication of an identification of the at least one information-overlay-interface element to be displayed on the graphical display. Such a visual indication may take any suitable form including a highlighting and/or underlining of the graphical-user-interface element that corresponds to the information-overlay element.

In connection with the correspondence between various information-overlay-interface elements and various respective graphical-user-interface elements, the selection of the at least one information-overlay-interface element may be associated with a selection of the corresponding at least one respective graphical-user-interface element. In other words, the selection of the information-overlay-interface element may serve as a proxy for the user's desire to indicate that the user seeks help regarding the corresponding graphical-user-interface element.

Further, the computing system may, before receiving the selection data, modify at least one graphical property of the graphical user-interface. For instance, as discussed above, and as depicted in FIGS. 9A and 9B, the graphical user-interface may be "dimmed" However, this is not necessary. In an alternative embodiment, the graphical user-interface may not be dimmed at all.

iii. Cause Visual Indication of Selection

The help mode also includes, at block 604C, causing a visual indication of the selection of the at least one information-overlay-interface element to be displayed on a graphical display. For instance, as a result of the selection, the computing system may cause an additional new content window to be displayed. In an embodiment, such a content window may take the form of content window 1104 or content window 1154 as discussed above.

Further, as discussed above, the selection data may further indicate a user-interface element type, a user-interface element location, and user-interface element text. Accordingly, the help mode may further involve determining at least one first-query response based on at least the selection data, or the user-interface element type, user-interface element location, and user-interface element text, as described above. The help mode may also involve causing a visual indication of the determined at least one first-query response to be displayed on the graphical display, as depicted in FIGS. 11A and 11B. Further, the help mode may involve any additional suitable features described above with respect to the first example method.

5. THIRD EXAMPLE METHOD

FIG. 7 shows a flowchart depicting functions that can be carried out in accordance with at least one embodiment of a third example method. As shown in FIG. 7, method 700 begins at block 702 with a computing system causing a display of a content window on a graphical display, the content window including a content element and a feedback element. At block 704, the computing system receives feedback data indicating a selection of the feedback element and a utility of the content element. And at block 706, the computing system, in response to receiving the feedback data, no longer causes the display of the content window on the graphical display, where the content window is displayed at least until the feedback data is received. The steps of method 700 are explained in the following subsections.

And although method 700 may be carried out by server 106, this is not required. In some embodiments, method 700 may be carried out entirely, or in part, by network-access device 102A or some other computing system that may or may not be communicatively coupled to any network.

a. Cause Display of Content Window Including Content Element and Feedback Element At block 702, causing a display of a content window on a graphical display, the content window including a content element and a feedback element. As one example the computing system may display content window 1204 as depicted in FIG. 12A. As shown, content window 1204 includes a content element in the form of second-query responses 1206A-1206B and includes a feedback element in the form of helpfulness buttons 1208A-1208D.

In an embodiment, the content element may include information corresponding to a graphical-user-interface element. For example, in the example shown in FIG. 12A, the content element in the form of second-query responses 1206A-1206B includes information (i.e., answers to questions relevant to help sought by the user) corresponding to the graphical-user-interface element button element 806C.

Further, in an embodiment, the feedback element may be the only element within the content window that allows the user to close, exit, or otherwise dismiss the content window. Thus, in the example shown in FIG. 12A helpfulness buttons 1208A-1208D may be the only elements within content window 1204 that allows the user to close, exit, or otherwise dismiss content window 1204. That is, second-query responses 1206A-1206B may not be selectable. And further, note that content window 1204 does not include any other elements, selectable or otherwise, including an "exit" and/or "close" button.

b. Receive Feedback Data Indicating Selection of Feedback Element and Utility of Content Element At block 704, the computing system receives feedback data indicating a selection of the feedback element and a utility of the content element. For example a user may select one of helpfulness buttons 1208A-1208D and, as a result, submit to the computing system feedback data indicating whether the content element, or second-query responses 1206A-1206B, was helpful.

In an embodiment, before receiving the feedback data, the computing system may cause the display of a feedback prompt indicating that the feedback element should be selected. For instance, content window 1204 may additionally include a prompt indicating that the user must select one of helpfulness buttons 1208A-1208D. Alternatively, the computing system may, in response to the user attempting to interact with the user-interface in any manner other than selecting one of helpfulness buttons 1208A-1208D, provide a prompt indicating that the user must select one of helpfulness buttons 1208A-1208D.

Further, in an embodiment, the computing system may determine a relevance of the content element based on at least the indication of the utility of the content element. Such a relevance may be determined in accordance with any of the relevance-determination techniques described above.

And further still, the feedback data may further indicate an author of the content element. Accordingly, the computing system may be arranged to recognize, and perhaps store, whether the content provided by a given author was identified as helpful or, alternatively, identified as not helpful.

c. No Longer Display Content Window

At block 706, the computing system, in response to receiving the feedback data, no longer causes the display of the content window on the graphical display, where the content window is displayed at least until the feedback data is received. That is, the content window is closed when, and only when, the user provides feedback regarding the utility of the content element. According to such a feature, feedback information regarding the content displayed in the content window is conveniently, yet mandatorily, provided within the normal course of the user's interaction with the user-interface.

6. ADMINISTRATION OF USER-INTERFACE

As described above, the computing system may store various first-query responses (questions) and second-query responses (answers) for presentation to users that seek help regarding particular user-interface elements. As also described above, users of the user-interface may submit such first-query responses and second-query responses to the computing system in the normal course of the users' interaction with the user-interface.

It is of note that the user-interface may also include various administration features that, among other features, may include the ability for an administrator of the user-interface to populate various first-query responses and second-query responses for the user-interface. In this way, an administrator may submit anticipated questions and associated answers corresponding to the user-interface prior to any actual use of the user-interface by a user. In this way the administrator may "seed" initial content of the help mode described above, and thereby encourage use of the help mode. And note that an "administrator" may be any user of the user-interface. That is, any user may be given privileges, explicitly or implicitly, to carry out the administrative functions described herein.

Further, as noted above, in the normal course of a user's interaction with the user-interface, the user may submit various first-query responses, or questions, that may not have previously existed. Such submitted questions may be drawn to the attention of the administrator, and the administrator may responsively submit an answer associated with the user-submitted question.

Further, as noted above, in the normal course of a user's interaction with the user-interface, the user may submit answer-needed data indicating that an answer corresponding to a first-query response is needed. Such a submission may similarly be drawn to the attention of the administrator, and the administrator may responsively submit an answer corresponding to the first-query response.

Those of skill in the art will appreciate that the user-interface may include additional suitable administrative features so as to assist and/or improve the function of the user-interface including a help mode associated with the user-interface.

7. CONCLUSION

While various aspects and embodiments have been disclosed herein, other aspects and embodiments will be apparent to those skilled in the art. For example, with respect to the flow charts depicted in the figures and discussed herein, functions described as blocks may be executed out of order from that shown or discussed, including substantially concurrent or in reverse order, depending on the functionality involved. Further, more or fewer blocks and/or functions may be used and/or flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique.

The various aspects and embodiments disclosed herein are for purposes of illustration and are not intended to be limiting, with the true scope and spirit being indicated by the following claims. Other embodiments can be utilized, and other changes can be made, without departing from the spirit or scope of the subject matter presented herein.

The invention claimed is:

1. A computer implemented method comprising:
   entering into a help mode of a graphical user interface for a computing system, wherein at least some functionality of the graphical user interface is suspended while in the help mode;
   while in the help mode,
      identifying an identified user-interface element of the graphical user interface, and
      after identifying the identified user-interface element of the graphical user interface, receiving first-query data at the computing device, the first-query data comprising contextual data for the identified user-interface element of the graphical user interface, the contextual data indicating a user-interface element type for the identified user-interface element, a user-interface element location for the identified user-interface element within the graphical user interface, and user-interface element text for the identified user-interface element;
   after receiving the first-query data, determining at least one ordered first-query response based on at least the contextual data using the computing system by at least:
      determining a respective context score for each determined at least one first-query response based on the contextual data, the context score based on at least one of an element-type metric that is based on the user-interface element type, an element-location metric that is based on the user-interface element location, and an element-text metric that is based on the user-interface element text; and
      determining an order for the determined at least one first-query response based on the respective context score for each determined at least one first-query response; and
   causing an indication of the determined at least one ordered first-query response to be provided using the graphical user interface via an output device associated with the computing system.

2. The method of claim 1, further comprising:
   receiving second-query data indicating a selection of one or more of the at least one first-query responses;
   determining at least one second-query response based on the second-query data; and
   causing an indication of the determined at least one second-query response to be provided via the output device.

3. The method of claim 1, wherein the first-query data further comprises search-term data indicating at least one search term, and wherein determining the at least one first query response comprises determining the at least one first-query response based on at least the contextual data and the search-term data.

4. The method of claim 1, wherein determining the respective context score for each determined at least one first-query response comprises:
   determining a first value of the element-type metric when the user-interface element type is in the first-query response, and determining a second value of the element-type metric when the user-interface element type is not in the first-query response.

5. The method of claim 2, further comprising:
   determining an order of the determined at least one second-query response based on a respective relevance of each determined at least one second-query response, wherein determining the respective relevance of each determined at least one second-query response comprises determining the respective relevance of each determined at least one second-query response based on at least an identity of an author of each determined at least one second-query response.

6. The method of claim 1, wherein entering into the help mode comprises dimming the graphical user interface.

7. The method of claim 2, further comprising:
   after causing the indication of the determined at least one second-query response to be provided, receiving helpfulness data indicating an extent to which the at least one second-query response was helpful.

8. The method of claim 2, further comprising:
   receiving answer data indicating an answer associated with a given first-query response;
   causing the answer data to be stored as a second-query response; and
   modifying a status of the author of the answer based on a helpfulness rating of the answer.

9. The method of claim 1, further comprising:
   receiving answer-needed data indicating that an answer corresponding to a first-query response is needed.

10. The method of claim 1, further comprising:
    receiving question data indicating a question associated with a given user-interface element; and
    causing the question data to be stored as a first-query response.

11. A system comprising:
    a processor;
    a non-transitory computer readable medium; and
    program instructions stored on the non-transitory computer readable medium and executable by the processor to:
       enter into a help mode of a graphical user interface, wherein at least some functionality of the graphical user interface is suspended while in the help mode;
       while in the help mode,
          identify an identified user-interface element of the graphical user interface, and
          after identifying the identified user-interface element of the graphical user interface, receive first-query data comprising contextual data for the identified user-interface element of the graphical user interface, the contextual data indicating a user-interface element type for the identified user-interface element, a user-interface element location for the identified user-interface element within the graphical user interface, and user-interface element text for the identified user-interface element;

after receiving the first-query data, determine at least one ordered first-query response based on at least the contextual data using the system to at least:

determining a respective context score for each determined at least one first-query response based on the contextual data, the context score based on at least one of an element-type metric that is based on the user-interface element type, an element-location metric that is based on the user-interface element location, and an element-text metric that is based on the user-interface element text; and determining an order for the determined at least one first-query response based on the respective context score for each determined at least one first-query response;

cause an indication of the determined at least one ordered first-query response to be provided using the graphical user interface via an output device;

receive second-query data indicating a selection of one or more of the at least one first-query responses;

determining at least one second-query response based on the second-query data; and cause an indication of the determined at least one second-query response to be provided via the output device.

12. The system of claim 11, wherein determining the respective context score for each determined at least one first-query response comprises:

determining a first value of the element-type metric when the user-interface element type is in the first-query response, and determining a second value of the element-type metric when the user-interface element type is not in the first-query response; and wherein the system further comprising program instructions stored on the non-transitory computer readable medium and executable by the processor to:

determine an order of the determined at least one second-query response based on a respective relevance of each determined at least one second-query response, wherein determining the respective relevance of each determined at least one second-query response comprises determining the respective relevance of each determined at least one second-query response based on at least an identity of an author of each determined at least one second-query response.

13. The system of claim 11, wherein entering into the help mode comprises dimming the graphical user interface, and the system further comprising program instructions stored on the non-transitory computer readable medium and executable by the processor to:

after causing the indication of the determined at least one second-query response to be provided, receive helpfulness data indicating an extent to which the at least one second-query response was helpful.

14. The system of claim 11, the system further comprising program instructions stored on the non-transitory computer readable medium and executable by the processor to:

receive answer-needed data indicating that an answer corresponding to a first-query response is needed;

receive answer data indicating an answer associated with a given first-query response;

cause the answer data to be stored as a second-query response; and modify a status of the author of the answer based on a helpfulness rating of the answer.

15. The system of claim 11, the system further comprising program instructions stored on the non-transitory computer readable medium and executable by the processor to:

receive question data indicating a question associated with a given user-interface element; and cause the question data to be stored as a first-query response.

16. A non-transitory computer readable medium having instructions stored thereon, the instructions comprising:

instructions for entering into a help mode of a graphical user interface, wherein at least some functionality of the graphical user interface is suspended while in the help mode;

instructions for, while in the help mode, identifying an identified user-interface element of the graphical user interface, and after identifying the identified user-interface element of the graphical user interface, receiving first-query data comprising contextual data, the contextual data for the identified user-interface element of the graphical user interface, the contextual data indicating a user-interface element type for the identified user-interface element, a user-interface element location for the identified user-interface element within the graphical user interface, and user-interface element text for the identified user-interface element;

instructions for, after receiving the first-query data, determining at least one ordered first-query response based on at least the contextual data by at least:

determining a respective context score for each determined at least one first-query response based on the contextual data, the context score based on at least one of an element-type metric that is based on the user-interface element type, an element-location metric that is based on the user-interface element location, and an element-text metric that is based on the user-interface element text; and determining an order for the determined at least one first-query response based on the respective context score for each determined at least one first-query response;

instructions for causing an indication of the determined at least one ordered first-query response to be provided using the graphical user interface via an output device;

instructions for receiving second-query data indicating a selection of one or more of the at least one first-query responses;

instructions for determining at least one second-query response based on the second-query data; and instructions for causing an indication of the determined at least one second-query response to be provided via the output device.

17. The non-transitory computer readable medium of claim 16, wherein the instructions for determining the respective context score for each determined at least one first-query response comprise:

instructions for determining a first value of the element-type metric when the user-interface element type is in the first-query response;

instructions for determining a second value of the element-type metric when the user-interface element type is not in the first-query response; and wherein the instructions further comprise:

instructions for determining an order of the determined at least one second-query response based on a respective relevance of each determined at least one second-query response, wherein determining the respective relevance of each determined at least one second-query response comprises determining the respective relevance of each determined at least one second-query response based on at least an identity of an author of each determined at least one second-query response.

18. The non-transitory computer readable medium of claim 16, wherein the instructions for entering into the help mode comprise instructions for dimming the graphical user interface, and the instructions further comprising:
instructions for, after causing the indication of the determined at least one second-query response to be provided, receiving helpfulness data indicating an extent to which the at least one second-query response was helpful.

19. The non-transitory computer readable medium of claim 16, the instructions further comprising:
instructions for receiving answer data indicating an answer associated with a given first-query response;
instructions for causing the answer data to be stored as a second-query response; and
instructions for modifying a status of the author of the answer based on a helpfulness rating of the answer.

20. The non-transitory computer readable medium of claim 16, the instructions further comprising:
instructions for receiving question data indicating a question associated with a given user-interface element; and
instructions for causing the question data to be stored as a first-query response.

21. A computer-implemented method comprising:
receiving help-mode data indicating a user-preference to enter a help mode corresponding to a graphical user-interface comprising at least one graphical-user-interface element;
entering the help mode corresponding to the graphical user-interface, wherein at least some functionality of the graphical user-interface is suspended while in the help mode, the help mode comprising:
providing an information-overlay interface corresponding to the graphical user-interface, wherein the information-overlay interface comprises at least one information-overlay-interface element corresponding to at least one respective graphical-user-interface element;
receiving selection data indicating a selection of the at least one information-overlay-interface element indicating an identified graphical-user-interface element of the graphical user-interface, wherein the selection data indicates a user-interface element type for the identified graphical-user-interface element, a user-interface element location for the identified graphical-user-interface element within the graphical user interface, and user-interface element text for the identified user-interface element, and wherein the at least one respective graphical-user-interface element comprises the identified graphical-user-interface element; and
after receiving the selection data, causing a visual indication of the selection of the at least one information-overlay-interface element to be displayed on a graphical display by at least:
determining at least one query response based on the selection data;
determining a respective context score for each determined at least one first-query response based on the selection data, the context score based on at least one of an element-type metric that is based on the user-interface element type, an element-location metric that is based on the user-interface element location, and an element-text metric that is based on the user-interface element text; and
determining an order for the at least one query response based on the respective context score for each of the at least one query response, and
causing a visual indication of the ordered at least one query response.

22. The method of claim 21, wherein the help mode further comprises:
before receiving the selection data, causing a visual indication of an identification of the at least one information-overlay-interface element to be displayed on the graphical display.

23. The method of claim 21, wherein providing the information-overlay interface comprises dimming the graphical user-interface.

24. The method of claim 21, wherein determining the respective context score for each of the at least one query response comprises:
determining a first value of the element-type metric when the user-interface element type is in the query response; and
determining a second value of the element-type metric when the user-interface element type is not in the query response.

25. The method of claim 21, wherein the help mode further comprises:
before receiving the selection data, modifying at least one graphical property of the graphical user-interface.

26. A non-transitory computer readable medium having instructions stored thereon, the instructions comprising:
instructions for receiving help-mode data indicating a user-preference to enter a help mode corresponding to a graphical user-interface comprising at least one graphical-user-interface element;
instructions for entering the help mode corresponding to the graphical user-interface, wherein at least some functionality of the graphical user-interface is suspended while in the help mode, the help mode comprising:
providing an information-overlay interface corresponding to the graphical user-interface, wherein the information-overlay interface comprises at least one information-overlay-interface element corresponding to the at least one respective graphical-user-interface element;
receiving selection data indicating a selection of the at least one information-overlay-interface element indicating an identified graphical-user-interface element of the graphical user-interface, wherein the selection data indicates a user-interface element type for the identified graphical-user-interface element, a user-interface element location for the identified graphical-user-interface element within the graphical user interface, and user-interface element text for the identified user-interface element, and wherein the at least one respective graphical-user-interface element comprises the identified graphical-user-interface element; and
after receiving the selection data, causing a visual indication of the selection of the at least one information-overlay-interface element to be displayed on a graphical display by at least:

determining at least one query response based on the selection data;

determining a respective context score for each determined at least one first-query response, the context score based on at least one of an element-type metric that is based on the user-interface element type, an element-location metric that is based on the user-interface element location, and an element-text metric that is based on the user-interface element text; and determining an order for the at least one query response based on the respective context score for each of the at least one query response, and causing a visual indication of the ordered at least one query response.

* * * * *